United States Patent
Matsumura et al.

(10) Patent No.: US 9,477,920 B2
(45) Date of Patent: Oct. 25, 2016

(54) RFID TAG

(71) Applicants: FUJITSU LIMITED, Kawasaki-shi, Kanagawa (JP); FUJITSU FRONTECH LIMITED, Inagi-shi, Tokyo (JP)

(72) Inventors: Takayoshi Matsumura, Yokohama (JP); Yoshiyasu Sugimura, Inagi (JP); Tsuyoshi Niwata, Inagi (JP); Mimpei Miura, Inagi (JP); Shunji Baba, Yokohama (JP)

(73) Assignees: FUJITSU LIMITED, Kawasaki (JP); FUJITSU FRONTECH LIMITED, Tokyo (JP)

( * ) Notice: Subject to any disclaimer, the term of this patent is extended or adjusted under 35 U.S.C. 154(b) by 0 days.

(21) Appl. No.: 14/832,327

(22) Filed: Aug. 21, 2015

(65) Prior Publication Data

US 2016/0071002 A1    Mar. 10, 2016

(30) Foreign Application Priority Data

Sep. 10, 2014 (JP) ................. 2014-184066
Feb. 16, 2015 (JP) ................. 2015-027581

(51) Int. Cl.
*G06K 19/06* (2006.01)
*G06K 19/07* (2006.01)
*G06K 19/02* (2006.01)
*G06K 19/077* (2006.01)

(52) U.S. Cl.
CPC ......... *G06K 19/0723* (2013.01); *G06K 19/027* (2013.01); *G06K 19/077* (2013.01)

(58) Field of Classification Search
CPC ............ G06K 19/0779; G06K 19/0775; G06K 19/0776

USPC ................................... 235/492, 487
See application file for complete search history.

(56) References Cited

U.S. PATENT DOCUMENTS

| | | | |
|---|---|---|---|
| 4,639,585 A | 1/1987 | Haghiri-Tehrani et al. | |
| 7,124,524 B2* | 10/2006 | Valenti, Jr. | G09F 1/04 40/27 |
| 7,540,428 B2* | 6/2009 | Baba | G06K 19/07749 235/451 |
| 7,598,867 B2* | 10/2009 | Carrender | G08B 13/24 340/572.1 |
| 8,022,829 B2* | 9/2011 | Takeda | G06K 19/07749 340/572.7 |

(Continued)

FOREIGN PATENT DOCUMENTS

EP  0 163 880 A2  12/1985
EP  1 887 496 A1  2/2008

(Continued)

OTHER PUBLICATIONS

European Search Report dated Feb. 25, 2016 corresponding to European Patent Application No. 15180903.5.

*Primary Examiner* — Daniel St Cyr
(74) *Attorney, Agent, or Firm* — Squire Patton Boggs (US) LLP

(57) ABSTRACT

A disclosed RFID tag includes: a base member; a semiconductor chip mounted on the base member; and an island-shaped reinforcing member covering the semiconductor chip and being configured to reinforce the base member. The reinforcing member has a side portion to which a recess is provided. The recess serves as an originating point of a fold line such that the fold line is formed away from the semiconductor chip when the reinforcing member is folded.

13 Claims, 33 Drawing Sheets

(56) References Cited

U.S. PATENT DOCUMENTS 8,531,298 B2 * 9/2013 Tuttle ............... G06K 19/07749
340/572.1
2011/0272470 A1 11/2011 Baba et al.

FOREIGN PATENT DOCUMENTS

| JP | 2011-221599 A | 11/2011 |
| JP | 2012-084050 A | 4/2012 |

* cited by examiner

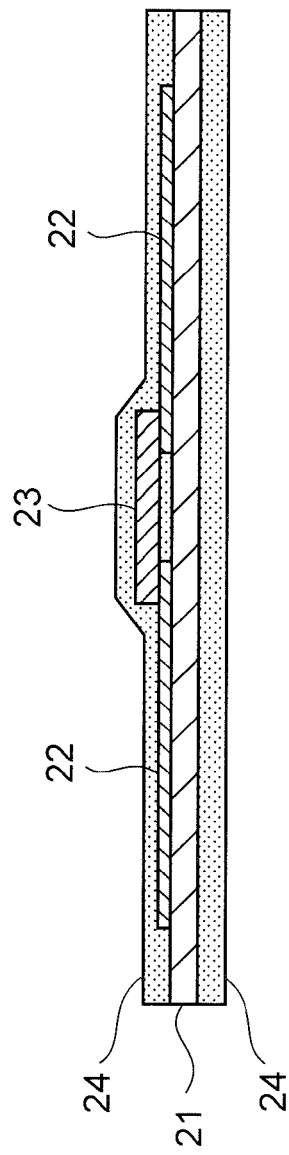
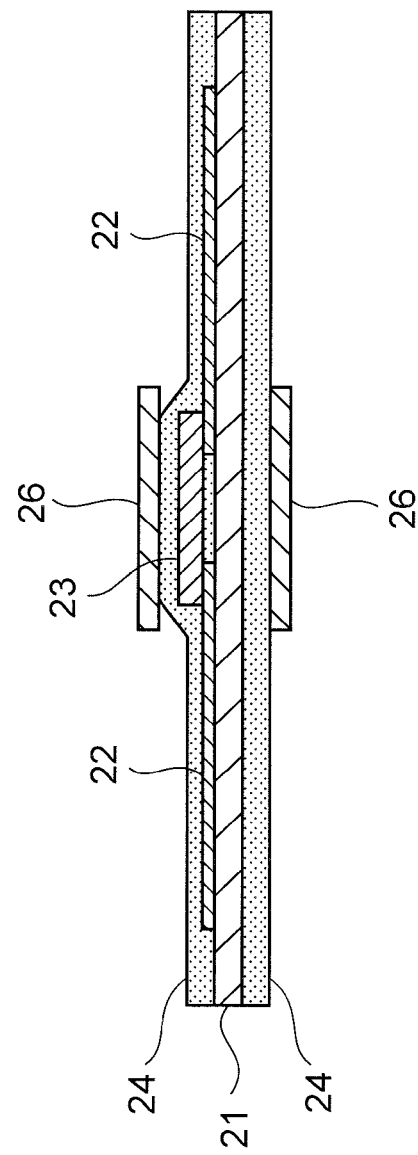
FIG. 31C
FIG. 31D

RFID TAG

CROSS-REFERENCE TO RELATED APPLICATION(S)

This application is based upon and claims the benefit of priority of the prior Japanese Patent Application No. 2014-184066, filed on Sep. 10, 2014, and Japanese Patent Application No. 2015-27581, filed on Feb. 16, 2015, the entire contents of which are incorporated herein by reference.

FIELD

The embodiments discussed herein are related to an RFID tag.

BACKGROUND

Along with the advance of information processing technology and reduction in size of semiconductor devices in recent years, RFID (Radio Frequency Identifier) tags are used in various situations in the society.

An RFID tag includes a semiconductor chip and an antenna, and the semiconductor chip is operated by an electromagnetic wave received by the antenna. The semiconductor chip stores ID information on an article which is the object of management, and a user manages the article by reading the ID information with an external device.

The object of management includes various articles. For example, merchandise in a shop, transport objects, books, linens, and the like can be managed by using the RFID tags.

Specifications of the RFID tags are optimized depending on the types of the objects of management. For example, when the RFID tags are attached to linens such as clothes and sheets, the RFID tags is provided with flexibility so that the RFID tags can withstand various pressures applied thereto at the time of washing the linens.

FIG. 1 is a cross-sectional view schematically illustrating a process to extract water from linens at the time of washing.

In the example illustrated in FIG. 1, linens 2 are put into a water extraction tank 1 and then water is extracted from the linens 2 by application of a pressure from above. When the RFID tags are too rigid, the RFID tags may get broken by the pressure in this process. Accordingly, it is preferable to provide sufficient flexibility to the RFID tags attached to the linens 2.

FIG. 2 is a cross-sectional view schematically illustrating the ironing process of the linens.

In the example in FIG. 2, a rotary roller 4 is rotated to guide a linen 2 to a gap between the rotary roller 4 and a heating head 3, and the linen 2 is ironed by pressing the linen 2 between the rotary roller 4 and the heating head 3. The ironing machine which employs the rotary roller 4 as described above is called a roll ironer.

When the linens 2 are pressed with the roll ironer, the linens 2 are deformed in accordance with the shape of the rotary roller 4. In order that the RFID tags can follow the deformation of the linens 2, it is preferable to provide flexibility to the RFID tags.

The techniques related to the present application are disclosed in Japanese Laid-open Patent Publications Nos. 2012-84050 and 2011-221599.

SUMMARY

According to one aspect discussed herein, there is provided an RFID tag including: a base member; a semiconductor chip mounted on the base member; and an island-shaped reinforcing member covering the semiconductor chip and being configured to reinforce the base member, the reinforcing member having a side portion to which a recess is provided, where the recess serving as an originating point of a fold line such that the fold line is formed away from the semiconductor chip when the reinforcing member is folded.

The object and advantages of the invention will be realized and attained by means of the elements and combinations particularly pointed out in the claim.

It is to be understood that both the forgoing general description and the following detailed description are exemplary and explanatory and are not restrictive of the invention.

BRIEF DESCRIPTION OF THE DRAWINGS

FIGS. 31A to 31E are cross-sectional views taken in the course of manufacturing the RFID tag according to the embodiment.

DESCRIPTION OF EMBODIMENTS

Prior to the descriptions of embodiments, considerations made by the inventor of the present application will be explained.

As mentioned above, by providing flexibility to the RFID tag for linen, it is possible to prevent the RFID tag from being broken since its shape is deformed in response to the pressures at the time of washing. On the other hand, such deformation in shape may cause a crack of a semiconductor chip in the RFID tag.

A possible solution to prevent the semiconductor chip from cracking is to build a reinforcing member in the RFID tag for reinforcing the RFID tag.

Figure 3:
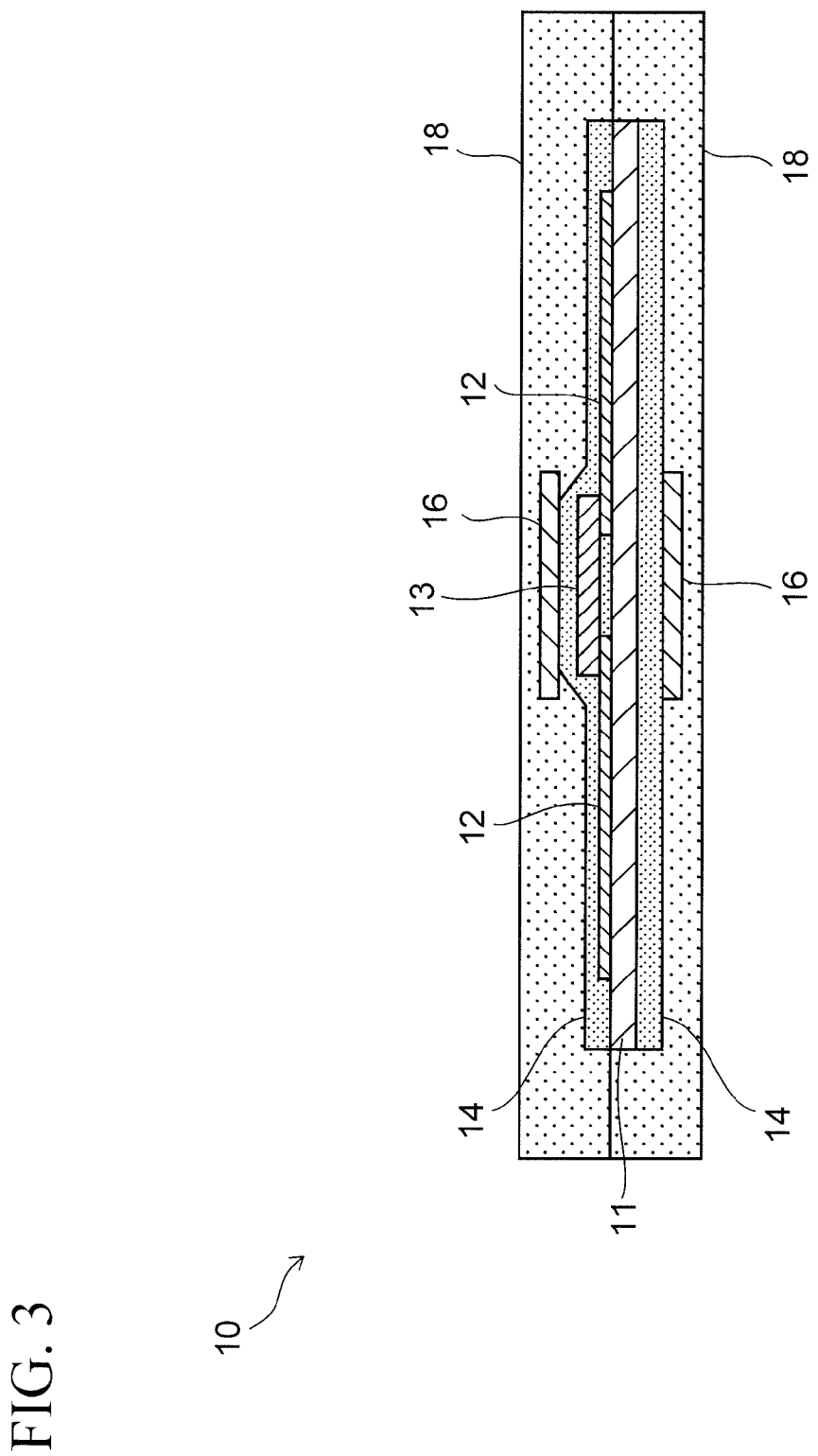
FIG. 3 is a cross-sectional view of an RFID tag provided with a reinforcing member examined by the inventor of the present application.

FIG. 3 is a cross-sectional view of an RFID tag provided with such a reinforcing member.

This RFID tag 10 includes an inlet base member 11 made of a resin such as PET (polyethylene terephthalate), and an antenna 12 provided on the surface of the base member 11. A semiconductor chip 13 is mounted on the antenna 12, and a protective sheet 14 is further attached onto the semiconductor chip 13.

The protective sheet 14 has a function to protect the antenna 12 and the semiconductor chip 13. For example, a PET sheet can be used as the protective sheet 14.

Note that another protective sheet 14 is attached to a back face of the inlet base member 11 on which the semiconductor chip 13 is not mounted.

Then, reinforcing members 16 are provided on the respective protective sheets 14 on the front and back sides of the inlet base member 11.

The reinforcing members 16 are resin plates made of PET and the like, which are provided at positions to cover the semiconductor chip 13 from the front and back sides of the semiconductor chip 13.

Moreover, elastic sheets such as rubber are provided as external members 18 onto the reinforcing members 16 on the front and back sides.

By using the elastic sheets as the external members 18 in this manner, flexibility is provided to the RFID tag 10

Figure 4:
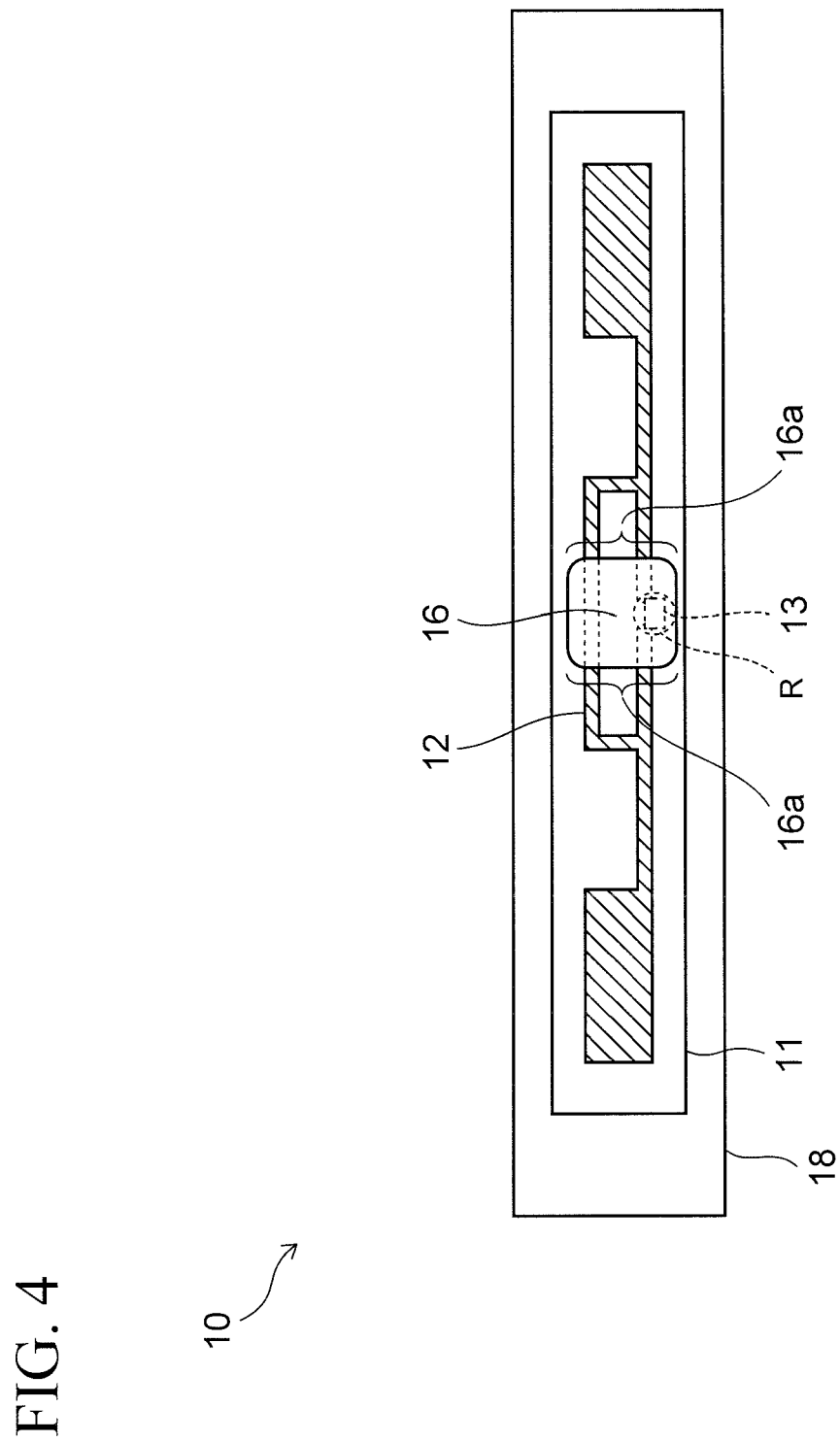
FIG. 4 is a plan view of the RFID tag provided with the reinforcing member examined by the inventor of the present application.

FIG. 4 is a plan view of the RFID tag 10.

As illustrated in FIG. 4, a chip mounting region R is provided near the center of the RFID tag 10 in this example, and the semiconductor chip 13 is mounted on the region R.

Meanwhile, the reinforcing member 16 has a rectangular shape which is larger than the semiconductor chip 13, and two straight edges 16a thereof intersect with the antenna 12 in a plan view.

Functions of the reinforcing member 16 will be described with reference to FIGS. 5A, 5B, and 6.

Figure 5B:
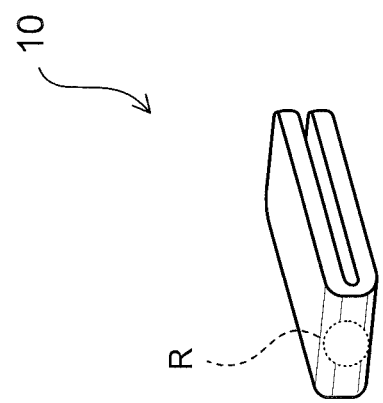
FIGS. 5A and 5B are perspective views of an RFID tag 10 not provided with a reinforcing member.
Figure 5A:
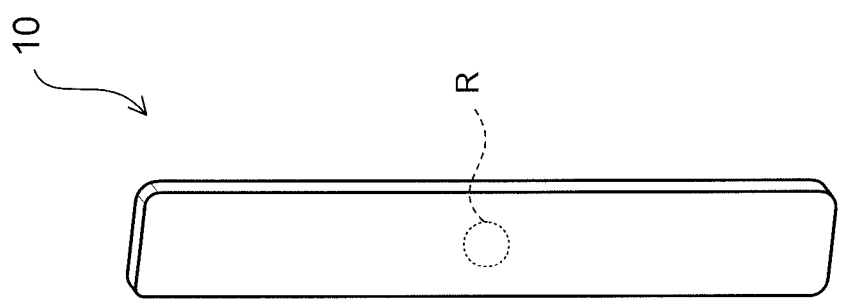

FIGS. 5A and 5B are perspective views of the RFID tag 10 without the reinforcing member 16.

Of these drawings, FIG. 5A is a perspective view of the RFID tag 10 when an external force is not applied thereto, and FIG. 5B is a perspective views when the external force is applied to the RFID tag 10.

As illustrated in FIG. 5A, the RFID tag 10 has a flat shape when the external force is not applied thereto.

On the other hand, as illustrated in FIG. 5B, when the external force is applied, the RFID tag 10 is folded at the chip mounting region R, which in turn results in clacking of the semiconductor chip 13 that is mounted on the region R.

Figure 6:
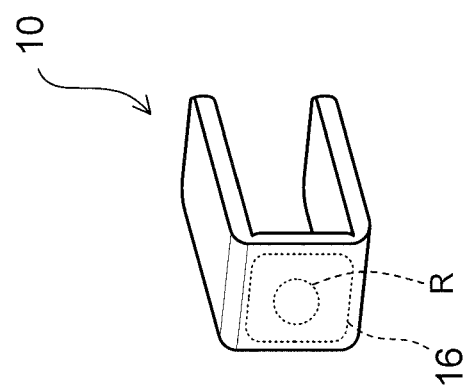
FIG. 6 is a perspective view illustrating a case where an external force acts on an RFID tag provided with a reinforcing member.

FIG. 6 is a perspective view illustrating the case where an external force is applied to the RFID tag 10 which is provided with the reinforcing members 16 as described above.

As illustrated in FIG. 6, rigidity of the RFID tag 10 is increased at a portion provided with the reinforcing members 16. Accordingly, even when the external force is applied, the portion of the RFID tag 10 is not bent. Thus, the semiconductor chip 13 located in the chip mounting region R is expected to be prevented from cracking.

Nonetheless, it turned out that the semiconductor chip 13 would crack depending on how the external force is applied to the RFID tag 10.

Figure 7:
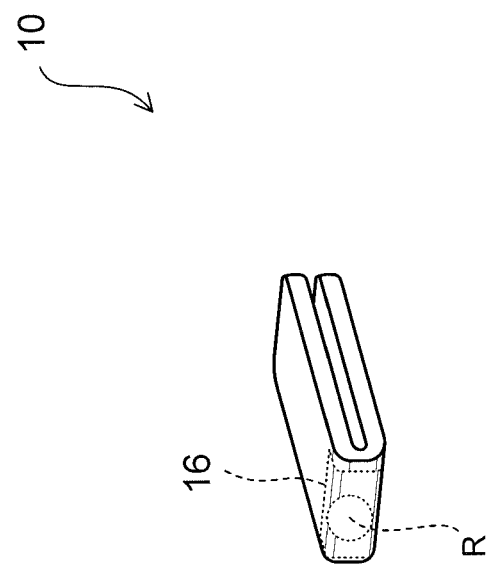
FIG. 7 is a perspective view of an RFID tag which is folded even though a reinforcing member is provided thereto.

FIG. 7 is a perspective view of the RFID tag 10 which is folded even though the reinforcing member 16 is provided thereto.

Figure 1:
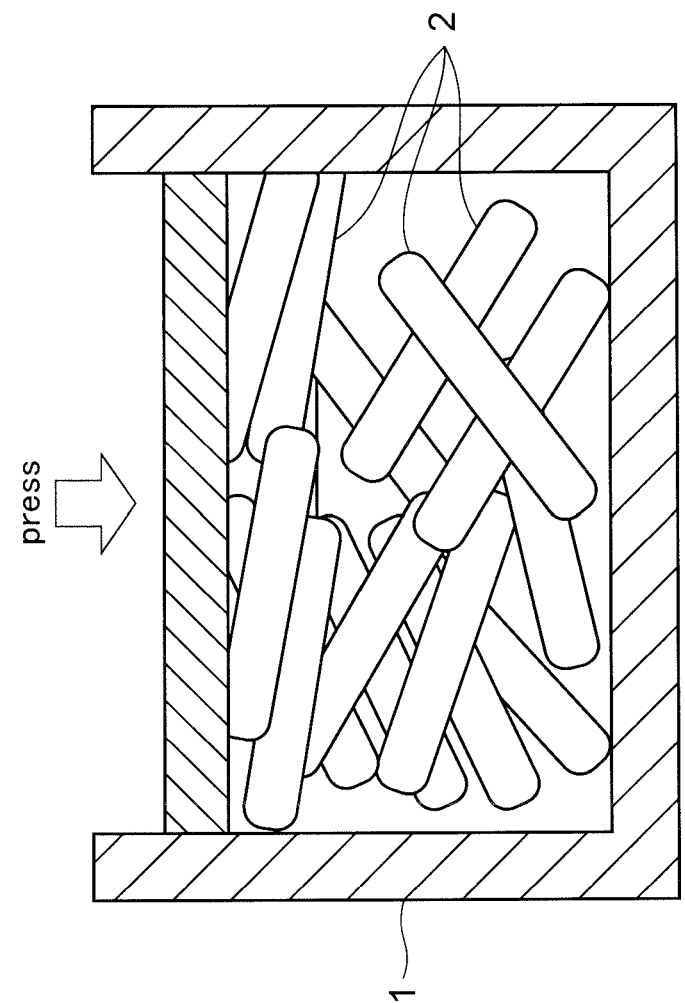
FIG. 1 is a cross-sectional view schematically illustrating a process to extract water from linens at the time of washing.
Figure 2:
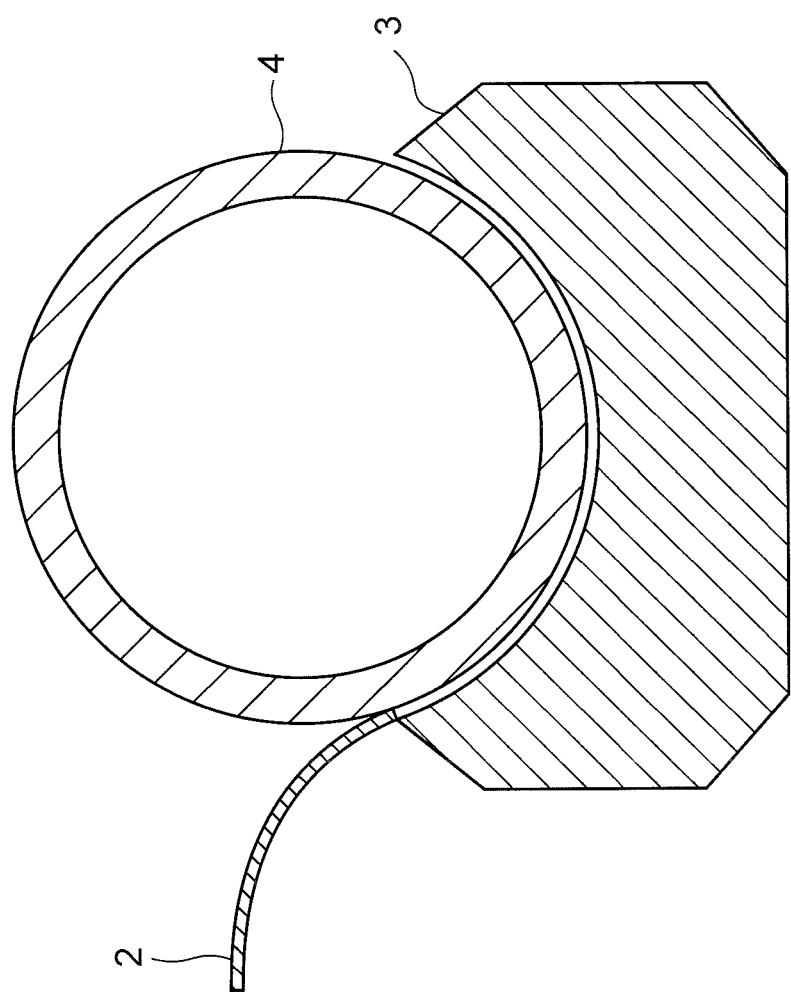
FIG. 2 is a cross-sectional view schematically illustrating the ironing process of the linens.

In the example illustrated in FIG. 7, the reinforcing member 16 is folded by the external force applied at the time of the water extraction in FIG. 1 or the ironing in FIG. 2. An examination conducted by the inventor of the present application revealed that such a fold would occur at a probability of about 1/1000. The fold of the reinforcing member 16 causes a crack of the semiconductor chip 13 located in the chip mounting region R.

Note that even when the reinforcing member 16 is not folded, another problem arises as described below.

Figure 8:
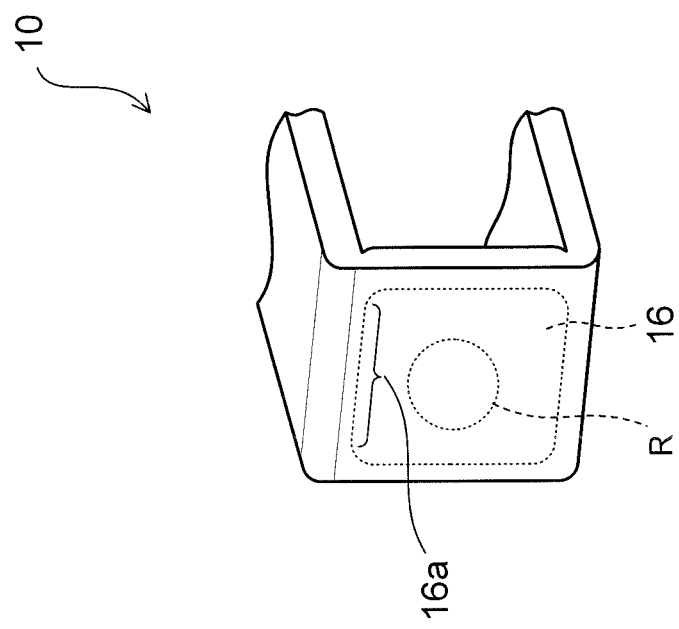
FIG. 8 is a perspective view for explaining a problem identified by the inventor of the present application.

FIG. 8 is a perspective view for explaining this problem.

In FIG. 8, a small external force, which cannot fold the reinforcing member 16, is assumed to act on the RFID tag 10.

In this case, the straight edge 16a of the reinforcing member 16 function as folding criteria. Accordingly, prominent fold are provided to the RFID tag 10.

Figure 9:
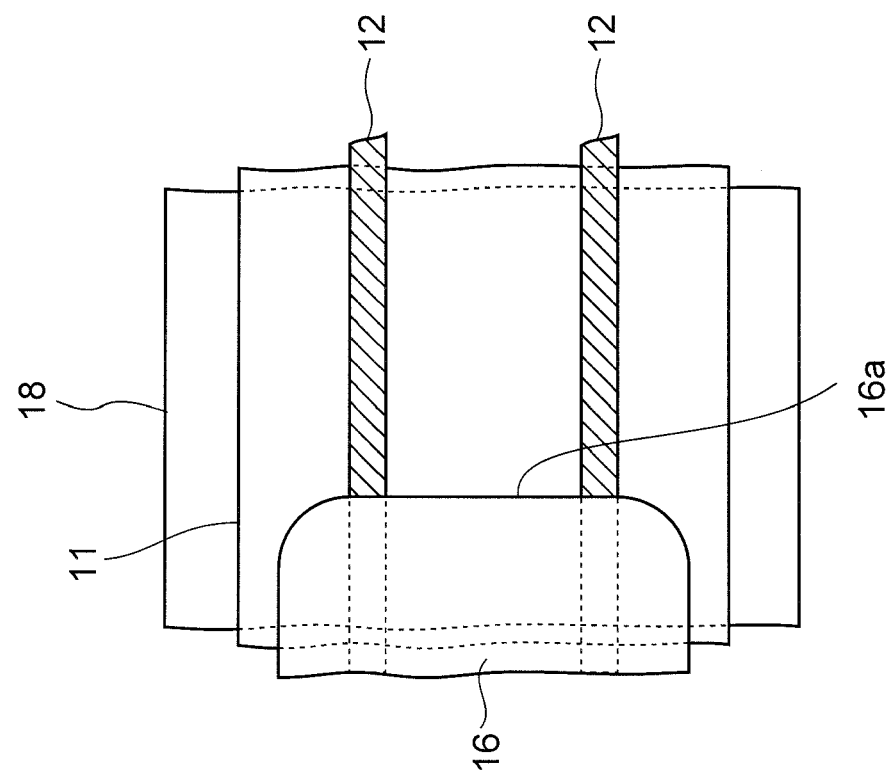
FIG. 9 is an enlarged plan view of a reinforcing member examined by the inventor of the present application, and a surrounding area thereof.

FIG. 9 is an enlarged plan view of the reinforcing member 16 and its surroundings.

As illustrated in FIG. 9, since the reinforcing member 16 intersects with the antenna 12, the antenna 12 may be disconnected by a force to be applied from the edge 16a to the antenna 12 when the prominent folds are provided to the RFID tag 10 as illustrated in FIG. 8.

In the followings, embodiments will be described below.

Embodiment

Figure 10:
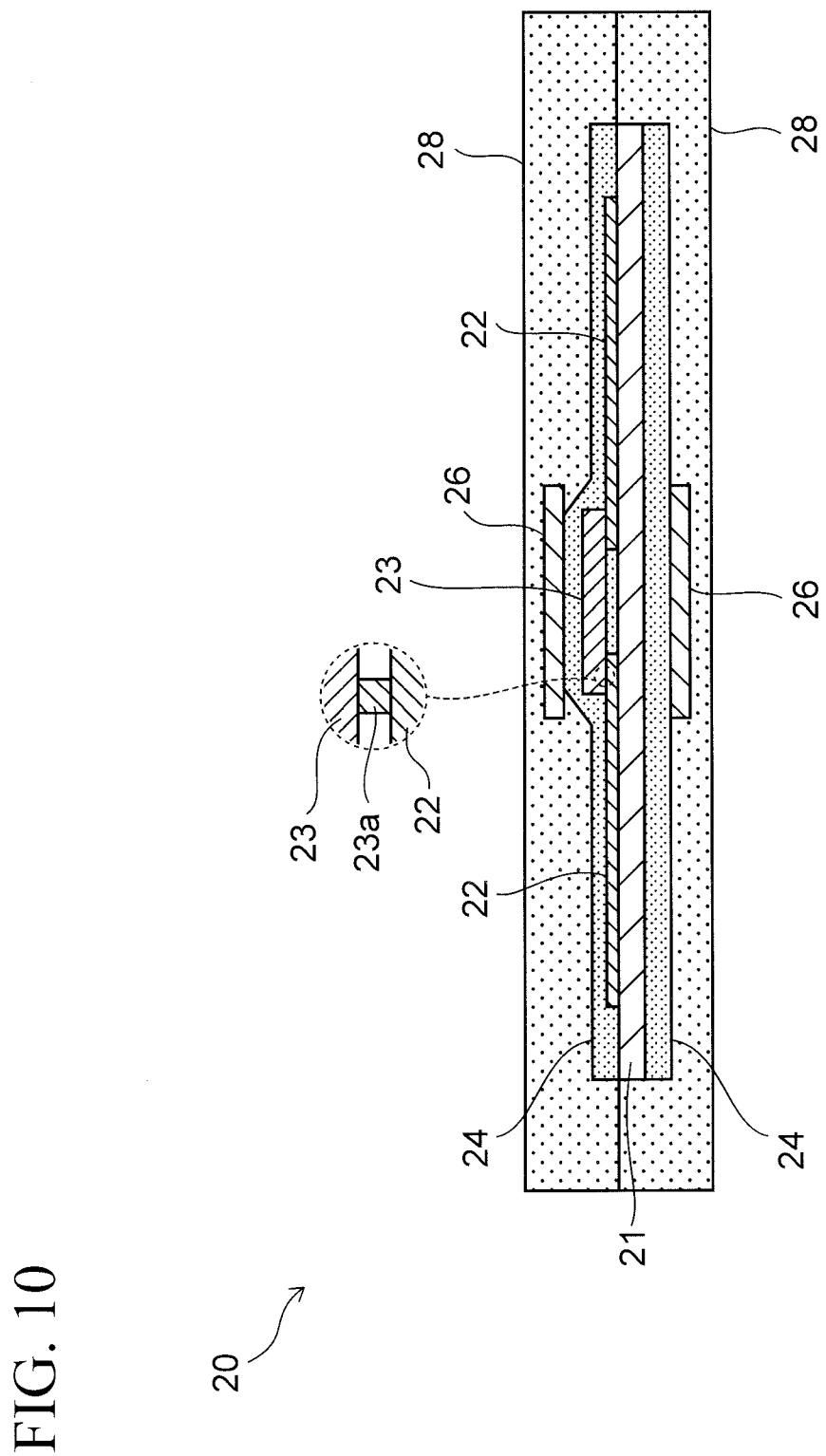
FIG. 10 is a cross-sectional view of an RFID tag according to an embodiment.

FIG. 10 is a cross-sectional view of an RFID tag according to the present embodiment.

This RFID tag 20 is a flexible tag to be attached to linen such as clothes, and includes an inlet base member 21 and a conductive pattern 22 provided on the base member 21.

The inlet base member 21 is a flexible resin sheet. In this example, a PET sheet having a thickness of about 30 μm to 100 μm is used as the inlet base member 21.

Meanwhile, the conductive pattern 22 is a silver pattern, for example, which is served as an antenna to communicate with an external device.

A semiconductor chip 23 is mounted on the conductive pattern 22. How to connect the conductive pattern 22 and the semiconductor chip 23 is not particularly limited. In this example, the conductive pattern 22 is connected to the semiconductor chip 23 through terminals 23a such as solder bumps and gold bumps.

Moreover, a protective sheet 24 such as a PET sheet is attached onto the conductive pattern 22 and the semiconductor chip 23. The conductive pattern 22 and the semiconductor chip 23 are protected by the protective sheet 24.

Note that another protective sheet 24 is attached to a back face of the inlet base member 21 on which the semiconductor chip 23 is not mounted.

Meanwhile, the protective sheet 24 preferably has a sufficiently small thickness so as not to damage flexibility of the RFID tag 20. In this example, the thickness of the protective sheet 24 is set in a range from about 50 μm to 300 μm.

Then, reinforcing members 26 each made of a resin are provided on the respective protective sheets 24 on the front and back sides of the inlet base member 21. Thus, the front and back sides of the semiconductor chip 23 are covered with the reinforcing members 26.

The reinforcing member 26 has a function to reinforce a portion of the RFID tag 20 around the semiconductor chip 23 and thereby to prevent the portion of the RFID tag 20 around the semiconductor chip 23 from being bent by an external force.

As long as the reinforcing member 26 retains this function, the material and the thickness of the reinforcing member 26 are not particularly limited. However, in order to ensure effectiveness in reinforcing the RFID tag 20, it is preferable to use the reinforcing member 26 formed from the material with the thickness achieving higher rigidity than that of the inlet base member 21. From this point of view, a PET plate having a thickness of 100 μm to 300 μm is used as the reinforcing member 26 in the present embodiment.

Here, materials other than PET usable as the material of the reinforcing members 26 include PEN (polyethylene naphthalate) and polyimide, for example.

Although the reinforcing members 26 are respectively provided on the front side and the back side of the semiconductor chip 23 in this example, the reinforcing member 26 may be provided only on one of the front side and the back side instead.

Then, elastic sheets such as rubber sheets are provided as external members 28 onto the reinforcing members 26 on the front and back sides. By use of the elastic sheets as the external members 28, flexibility is provided to the RFID tag 20 as described previously.

Here, the flexibility of the RFID tag 20 will be lost when the reinforcing members 26 are too thick. In the present embodiment, the flexibility of the RFID tag 20 is maintained by setting the thickness of each external member 28 in a range from 0.5 mm to 2.0 mm.

Figure 11:
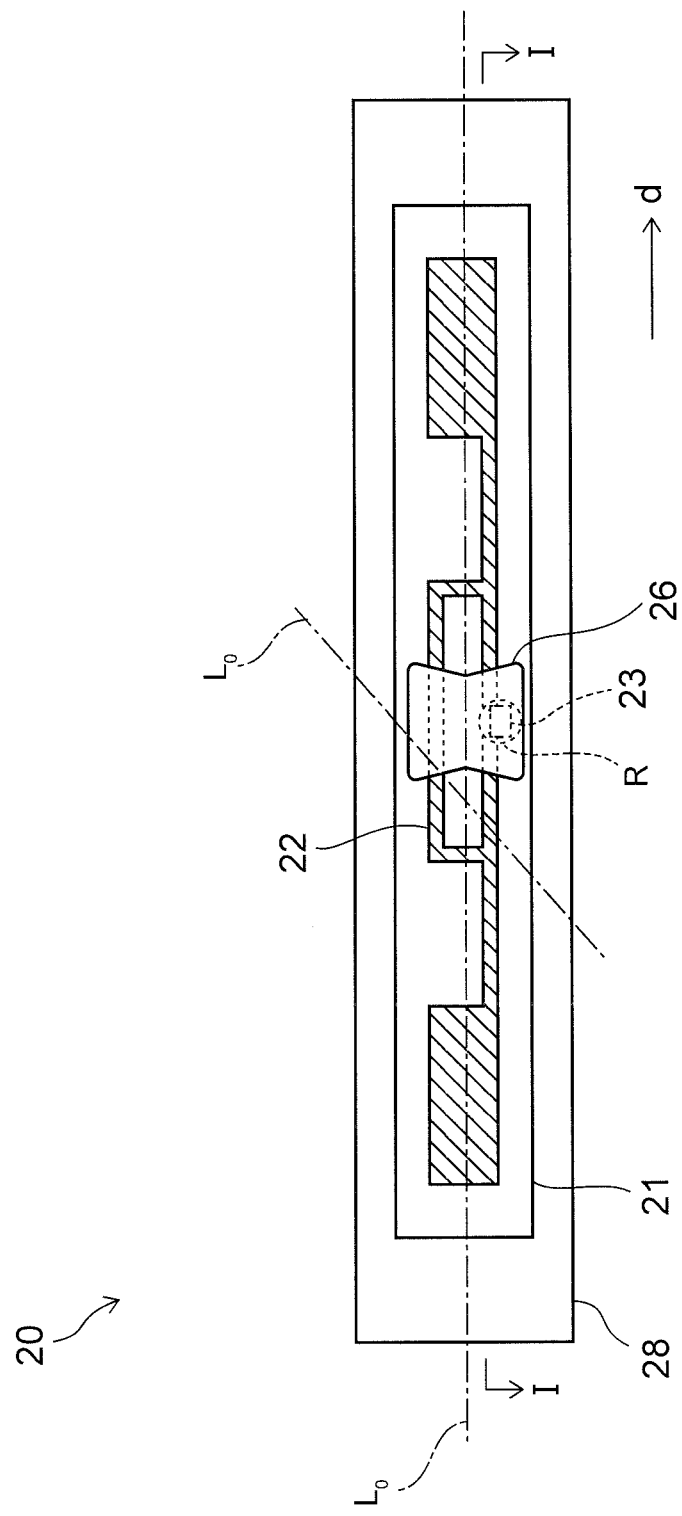
FIG. 11 is a plan view of the RFID tag according to the embodiment.

FIG. 11 is a plan view of the RFID tag 20.

Here, FIG. 10 described above corresponds to a cross-sectional view taken along the I-I line in FIG. 11. It is to be noted, however, that the protective sheet 24 and the external member 28 on the upper side are omitted in FIG. 11.

As illustrated in FIG. 11, the inlet base member 21 has an elongated shape, and a chip mounting region R to mount the semiconductor chip 23 is provided near the center of the inlet base member 21.

Moreover, the reinforcing member 26 has an island shape in a plan view, and is provided at a position to cover the semiconductor chip 23.

When this RFID tag 20 is used in a state attached to linen such as clothes, the RFID tag 20 may be folded in the course of the water extraction or ironing. Empirically, a resultant fold line $L_0$ is often provided parallel to a longitudinal direction d of the inlet base member 21 or obliquely to the longitudinal direction d.

Next, a planar shape of the reinforcing member 26 will be described in detail.

Figure 12:
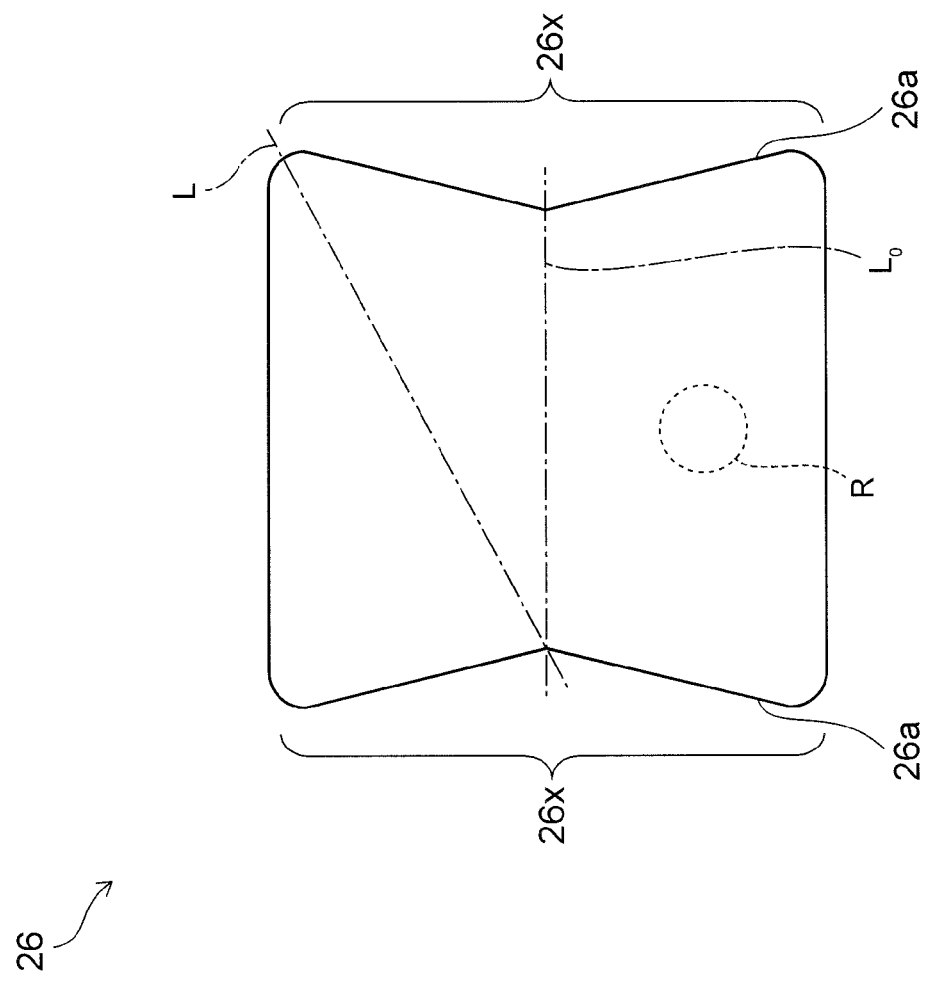
FIG. 12 is a plan view illustrating an example of a planar shape of a reinforcing member.

FIG. 12 is a plan view illustrating an example of the planar shape of the reinforcing member 26.

As illustrated in FIG. 12, recesses 26x are provided to side portions 26a of the reinforcing member 26.

The reinforcing member 26 is produced by punching a resin plate with a die having the same shape as the outline of the reinforcing member 26. Since the recesses 26x are formed simultaneously with the production of the reinforcing member 26, a dedicated process to form the recesses 26x is not required.

Meanwhile, the mechanical strength of the reinforcing member 26 in the recesses 26x is weak as described later. Therefore, the reinforcing member 26 receiving an external force is folded along a fold line L originating from the recess 26x.

Although there are some fold lines L originating from the recess 26x, the present embodiment assumes a line $L_0$ among these fold lines L, along which the reinforcing member 26 is most easily foldable. In the following, the line $L_0$ will be referred to as a reference line $L_0$.

Figure 13:
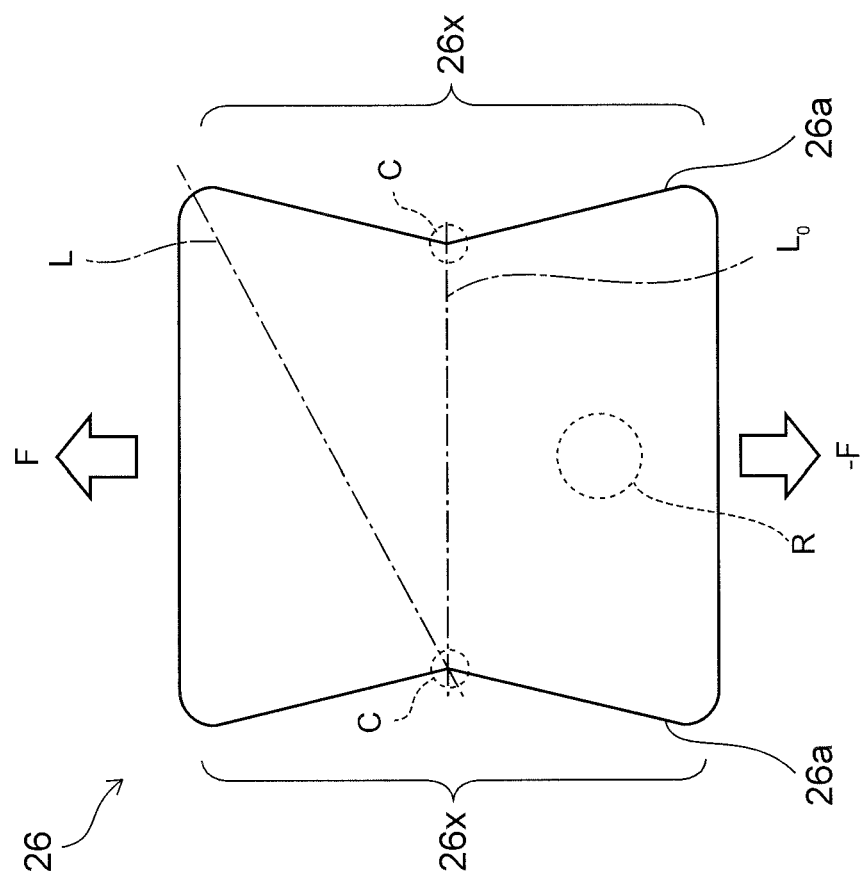
FIG. 13 is a plan view for explaining a reference line.

FIG. 13 is a plan view for explaining the reference line $L_0$.

A stress is concentrated more on the recess 26x than is on the other portions when an external force F acts on the reinforcing member 26 provided with the recess 26x as illustrated in FIG. 13. As a consequence, the reference line $L_0$ is formed from the recess 26x serving as originating point.

A stress concentration factor is an index which represents the degree of concentration of the stress on the recess 26x. The stress concentration factor is defined as a ratio of a maximum stress to a nominal stress of the reinforcing member 26 at the recess 26x thereof. A larger value of the stress concentration factor means that the stress is more likely to be concentrated on the recess 26x.

The stress concentration factor becomes particularly large at a portion of the recess 26x where its curvature radius is small. Accordingly, in the case where the curvature radius of the recess 26x becomes the smallest at a central part C of the recess 26x as in FIG. 13, the central part C becomes an originating point of the reference line $L_0$.

Here, bendability of the reinforcing member 26 can also be explained based on the cross-sectional area of the reinforcing member 26 as described below.

Figures 14A, 14B:
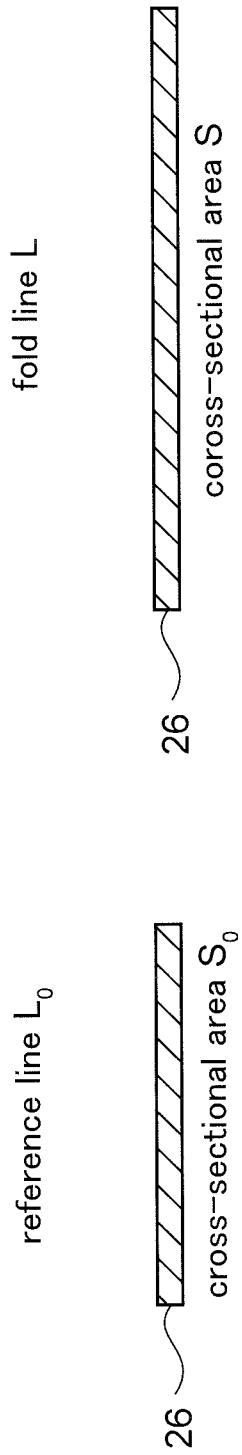
FIG. 14A is a cross-sectional view taken along the reference line in FIG. 13.
FIG. 14B is a cross-sectional view taken along a fold line other than the reference line in FIG. 13.

FIG. 14A is a cross-sectional view taken along the reference line $L_0$ in FIG. 13. Meanwhile, FIG. 14B is a cross-sectional view taken along a fold line L other than the reference line $L_0$ in FIG. 13.

The reference line $L_0$ in FIG. 14A is a line connecting the two central parts C of the two recesses 26x, which is a cross-sectional line involving the smallest cross-sectional area $S_0$ of the reinforcing member 26.

On the other hand, the fold line L in FIG. 14B is a cross-sectional line which involves a cross-sectional area S of the reinforcing member 26 greater than the minimal cross-sectional area $S_0$.

Since a portion of the reinforcing member 26 having a smaller cross-sectional area is bent more easily, the reinforcing member 26 is highly probable to be bent along the reference line $L_0$ having the smallest cross-sectional area as illustrated in FIG. 14A.

Reference is made to FIG. 12 again.

As illustrated in FIG. 12, in the present embodiment, the above-described reference line $L_0$ is located away from the chip mounting region R in a plan view.

Accordingly, even when the reinforcing member 26 is bent by the external force, the semiconductor chip 23 located in the chip mounting region R is not folded. Thus, it is possible to reduce a risk of breakage of the semiconductor chip 23.

Especially, the RFID tags 20 attached to linens such as clothes are frequently folded by various pressures at the time of washing the linens as described previously, and the reinforcing members 26 are apt to be bent by the pressures. Therefore, practical benefit can be obtained for such a RFID tag 20 by applying the present embodiment to prevent the cracks of the semiconductor chip 23.

Moreover, the reinforcing member 26 in the island shape is persistent to the twisting actions as compared to the case where the reinforcing member 26 has an elongated planar shape. As a consequence, when the RFID tag 20 is twisted, there is little risk that the reinforcing member 26 breaks off at the recess 26x as the originating point. Thus, durability of the RFID tag 20 is improved.

In addition, since the reinforcing member 26 is formed into the island shape, the remaining portions of the RFID tag 20, where the reinforcing member 26 is not provided, become more flexible. Thus, the shape of the RFID tag 20 can be deformed in response to various pressures at the time of washing.

Note that the shape of the reinforcing member 26 is not limited to the above. Various examples of the shapes of the reinforcing member 26 will be described below.

First Example

Figure 15:
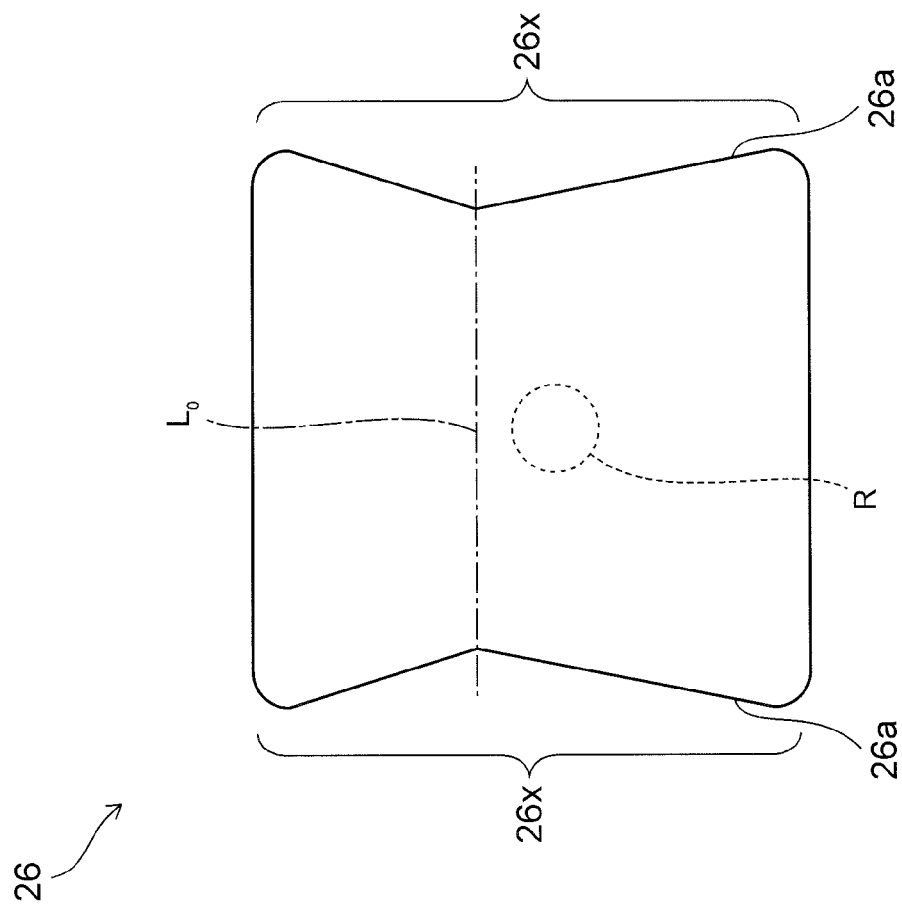
FIG. 15 is a plan view of a reinforcing member according to a first example of the embodiment.

FIG. 15 is a plan view of the reinforcing member 26 according to a first example.

In this example, the chip mounting region R is provided near the center of the reinforcing member 26.

Then, positions of two recesses 26x are shifted from the center of the reinforcing member 26 such that the reference line $L_0$ is located away from the chip mounting region R.

The reference line $L_0$ is parallel to the longitudinal direction d of the inlet base member 21 as illustrated in FIG. 11. As described previously, since a fold line parallel to the longitudinal direction d is apt to be provided at the time of washing, this example is particularly effective in order to prevent the semiconductor chip 23 from cracking at the time of washing. This is also the case for the examples in FIG. 17, FIG. 18, FIG. 19, FIG. 20, FIG. 22, and FIG. 26 which are described later.

Figure 16:
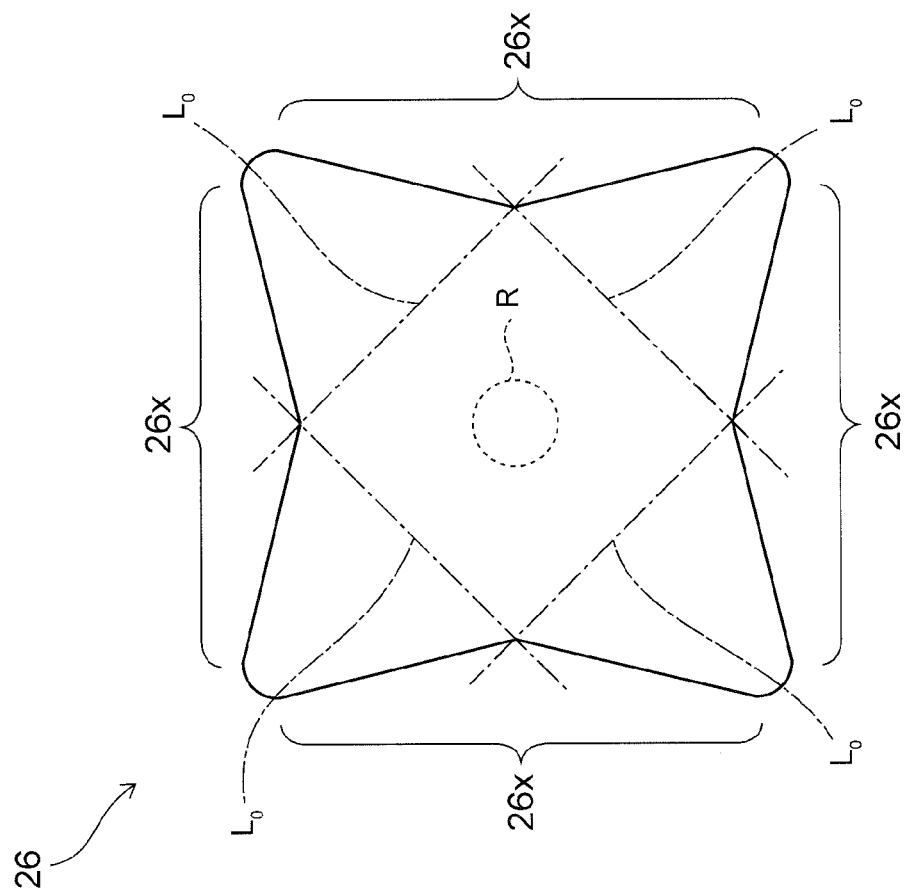
FIG. 16 is a plan view of the reinforcing member according to the first example of the embodiment provided with more than two recesses.

Here, as illustrated in FIG. 16, more than two recesses 26x may be provided so as to form a plurality of reference lines $L_0$ in different directions. In this way, it is possible to inhibit the semiconductor chip 23 from cracking even when the fold line is provided obliquely to the longitudinal direction d as illustrated in FIG. 11. This is also the case for the example in FIG. 19 described later.

Second Example

Figure 17:
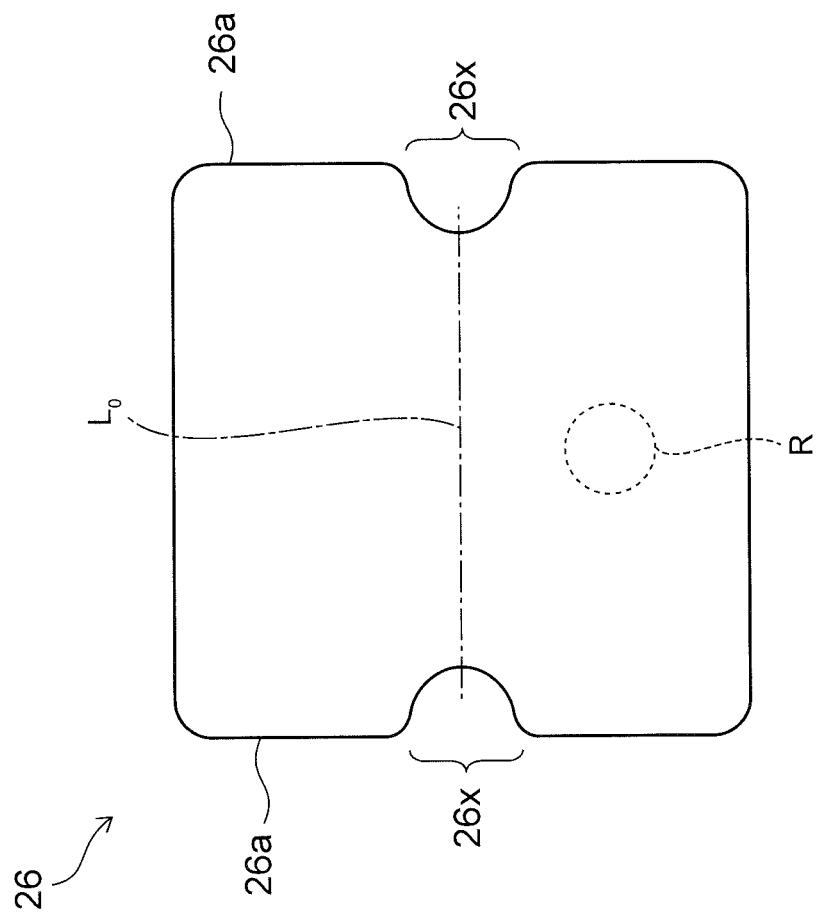
FIG. 17 is a plan view of a reinforcing member according to a second example of the embodiment.

FIG. 17 is a plan view of a reinforcing member 26 according to a second example.

In this example, two opposed notches are provided as the recesses 26x, and the chip mounting region R is located away from the reference line $L_0$ passing through the recesses 26x.

Figure 18:
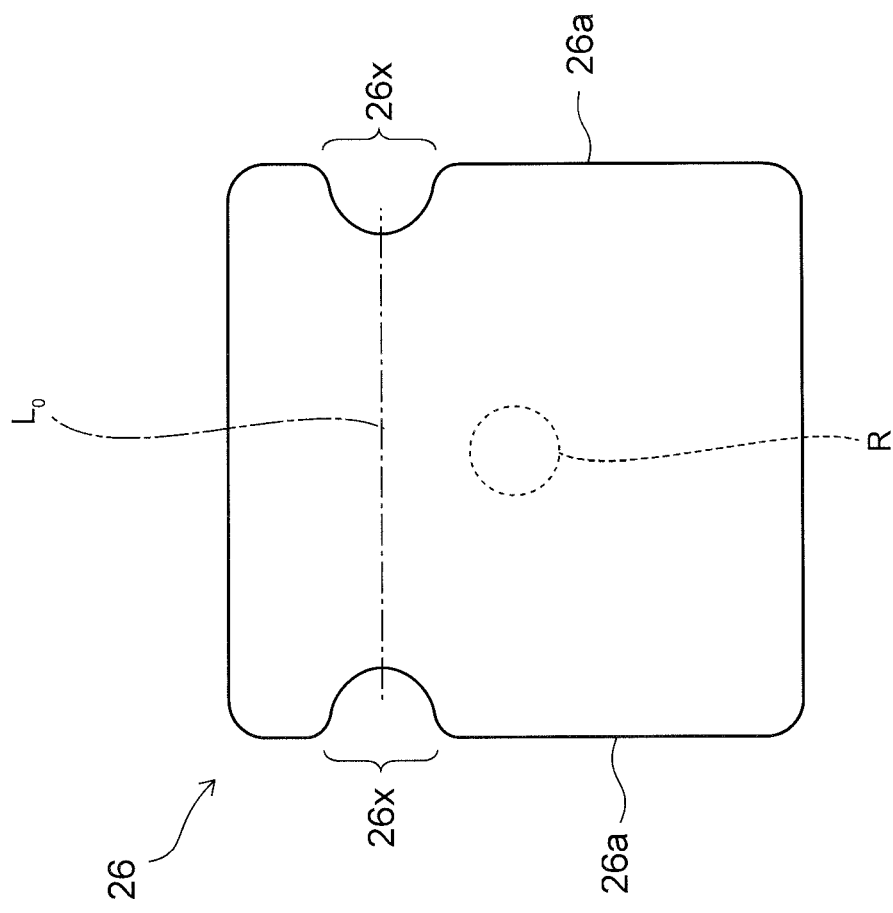
FIG. 18 is a plan view of the reinforcing member according to the second example of the embodiment, in which a chip mounting region is provided near the center of the reinforcing member and positions of the recesses are shifted such that a reference line is located away from the chip mounting region.

Note that as illustrated in FIG. 18, the chip mounting region R may be provided near the center of the reinforcing member 26, and positions of the two recesses 26x may be shifted such that the reference line $L_0$ is located away from the chip mounting region R.

Figure 19:
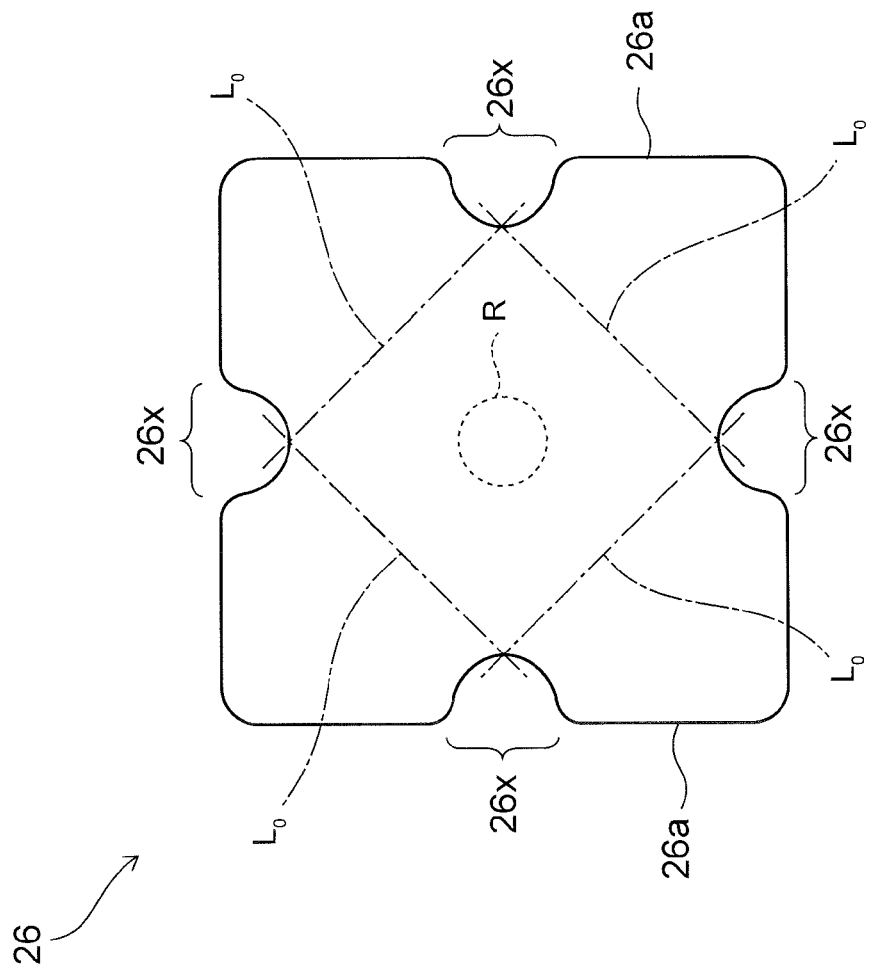
FIG. 19 is a plan view of the reinforcing member according to the second example of the embodiment provided with more than two recesses.

Furthermore, as illustrated in FIG. 19, more than two recesses 26x may be provided so as to form a plurality of reference lines $L_0$ in different directions.

Third Example

Figure 20:
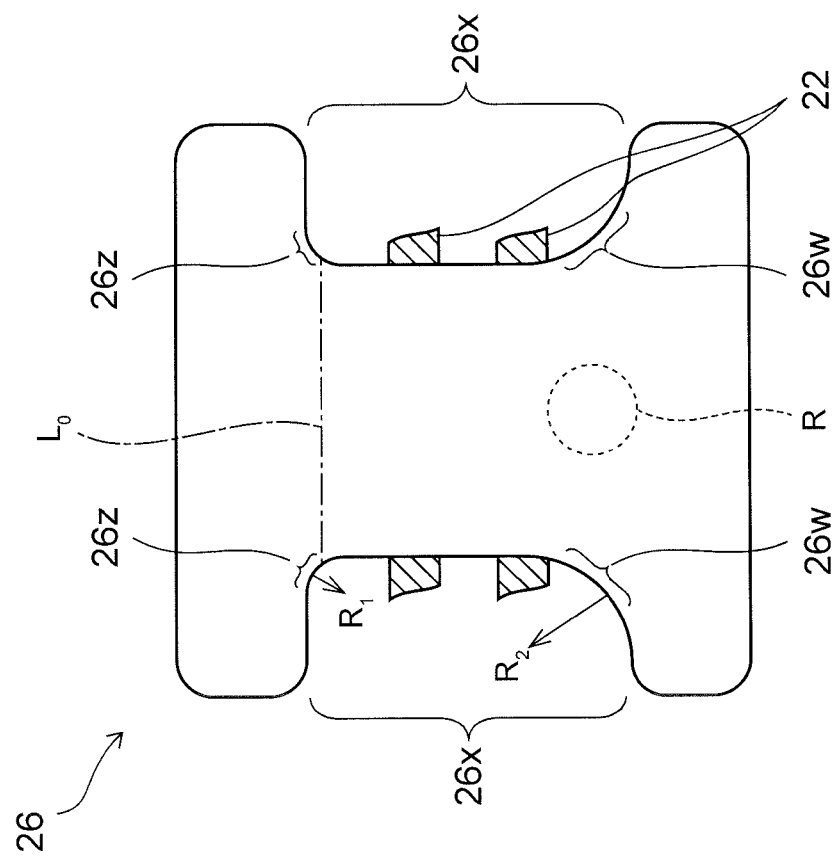
FIG. 20 is a plan view of a reinforcing member according to a third example of the embodiment.

FIG. 20 is a plan view of a reinforcing member 26 according to a third example.

Note that in FIG. 20, the conductive pattern 22 is illustrated together with the reinforcing member 26. This is also the case for FIGS. 21 to 26 to be described later.

In this example, a first curved portion 26z is provided to one of two corners at a bottom of the recess 26x, while a second curved portion 26w is provided to the other corner thereof. The first curved portion 26z has a first curvature radius $R_1$ while the second curved portion 26w has a second curvature radius $R_2$ which is greater than the first curvature radius R.

Due to the difference in curvature radius mentioned above, the second curved portion 26w is curved more gently than the first curved portion 26z.

Then, the chip mounting region R is provided closer to the second curved portion 26w than to the first curved portion 26z.

As described previously, a portion of the reinforcing member 26 having a smaller curvature radius is bent more easily. As a consequence, in this example, the reference line $L_0$ passes through the first curved portion 26z having the smaller curvature radius among those of the curved portions 26z and 26w.

Accordingly, by providing the chip mounting region R closer to the second curved portion 26w as in this example, the chip mounting region R is located away from the reference line $L_0$, and the probability of a crack of the semiconductor chip 23 is reduced as a consequence.

Although the positions and the number of the recesses 26x are not particularly limited, as illustrated in FIG. 20, it is preferable to provide the two recesses 26x opposite to each other, then to bring the first curved portions 26z opposite to each other, and to bring the second curved portions 26w opposite to each other.

In this way, the position of the reference line $L_0$ is established in such a way as to pass through the two first curved portions 26z. Thus, it is possible to surely locate the chip mounting region R away from the reference line $L_0$, and thus to further reduce the probability of a crack of the semiconductor chip 23.

Although a positional relationship between the recess 26x and the conductive pattern 22 is not particularly limited, it is preferable to cause the recesses 26x and the conductive pattern 22 to overlap one another in a plan view as in this example.

Figure 21:
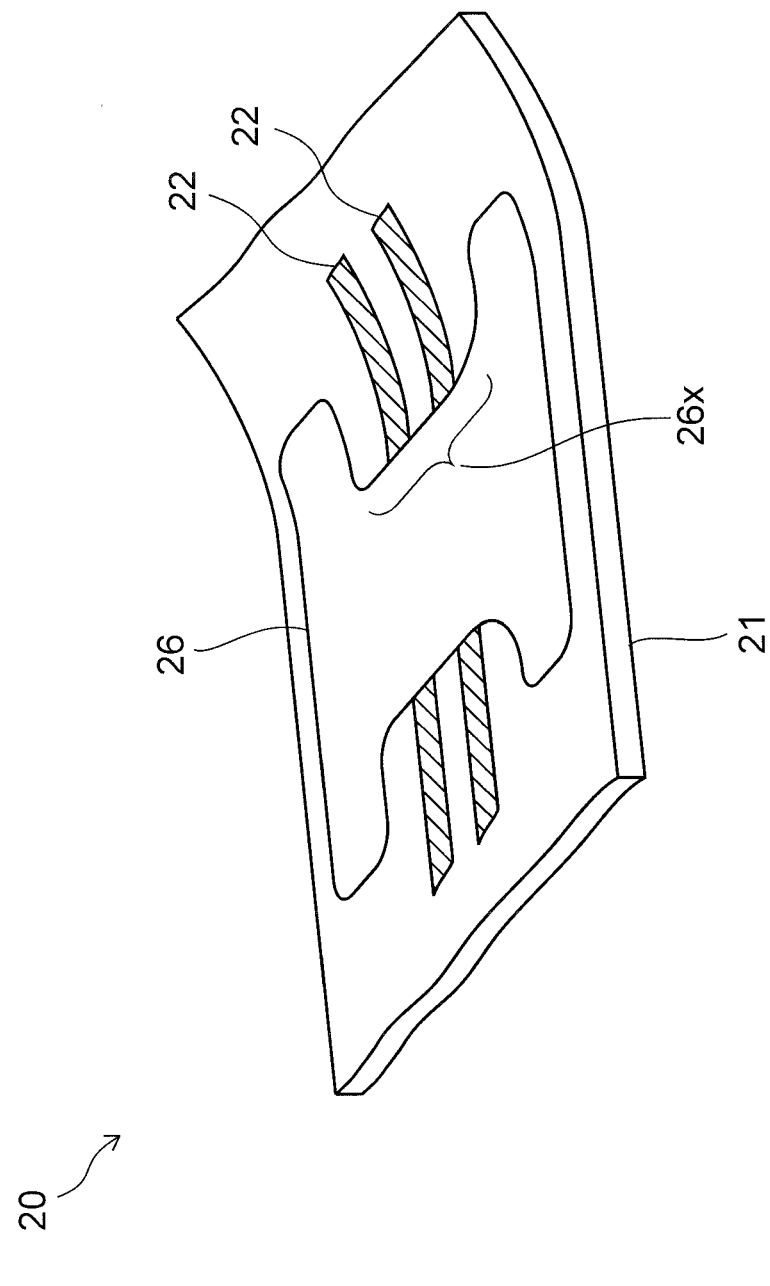
FIG. 21 is a schematic diagram for explaining an effect obtained by causing recesses and a conductive pattern to overlap one another in the third example of the embodiment.

FIG. 21 is a schematic diagram for explaining an effect obtained by causing the recess 26x and the conductive pattern 22 to overlap one another.

In FIG. 21, the RFID tag 20 is assumed to be bent by the external force.

In this case, the recesses 26x in the curved shape do not served as a fold line of the RFID tag 20. Hence, no prominent fold is provided along the recesses 26x. Instead, the RFID tag 20 is gently folded near the recesses 26x.

Accordingly, unlike the example in FIG. 9, the risk of disconnection of the conductive pattern 22 attributed to the force applied from the reinforcing member 26 is reduced, and durability of the RFID tag 20 is improved as a consequence. This is also the case for fourth to eighth examples to be described below.

Fourth Example

Figure 22:
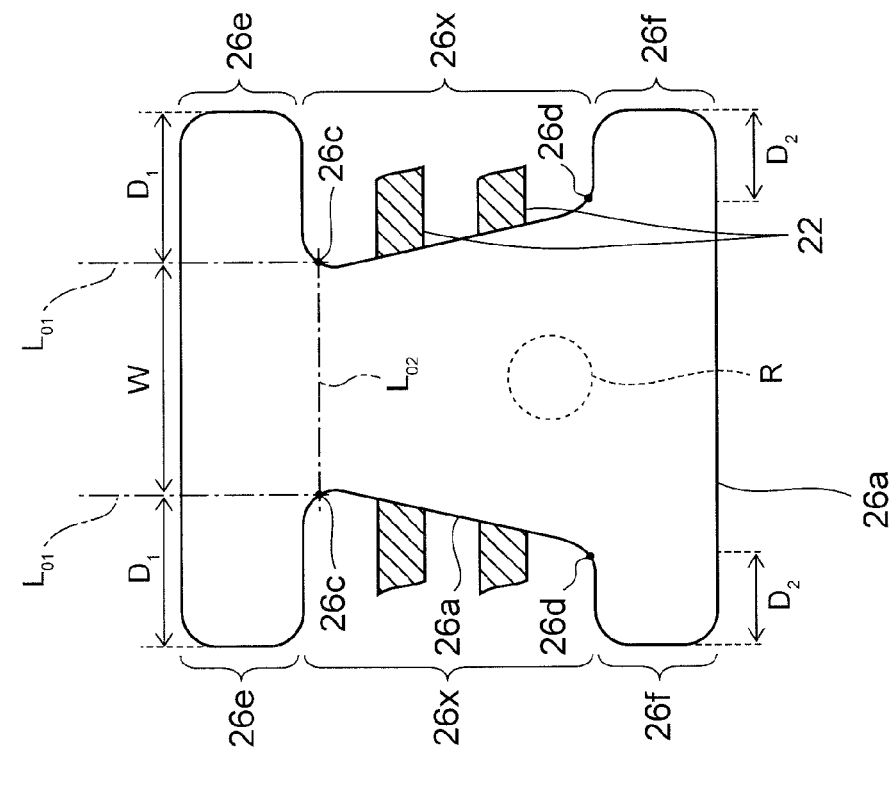
FIG. 22 is a plan view of a reinforcing member according to a fourth example of the embodiment.

FIG. 22 is a plan view of a reinforcing member 26 according to a fourth example.

In this example, a first point 26c and a second point 26d are set to each side portion 26a of the reinforcing member 26. Then, a first projection 26e projecting by a first distance $D_1$ from the first point 26c and a second projection 26f projecting by a second distance $D_2$ from the second point 26d are provided such that the projections 26e and 26f are opposed to each other. Thus, two sides of the recess 26x are defined by the projections 26e and 26f.

Here, the second distance $D_2$ is shorter than the first distance $D_1$.

Then, the chip mounting region R is provided closer to the second projection 26f than to the first projection 26e.

The first projection 26e is longer than the second projection 26f and is therefore more likely to be bent. Accordingly, in this example, a reference line $L_{01}$ extends from the first point 26c in such a way as to traverse the first projection 26e.

Therefore, by providing the chip mounting region R closer to the second projection 26f as described above, the chip mounting region R is located away from the reference line $L_{01}$, and the probability of a crack of the semiconductor chip 23 is reduced as a consequence.

Although the positions and the number of the recesses 26x are not particularly limited, as illustrated in FIG. 22, it is preferable to provide the two recesses 26x opposite to each other, then to bring the first projections 26e opposite to each other, and to bring the second projections 26f opposite to each other.

In this way, an interval W between the first points 26c of the recesses 26x is reduced, and a reference line $L_{02}$ is likely to be formed to pass through the points 26c. Furthermore, since the chip mounting region R is provided close to the second projections 26f, it is unlikely that the reference line $L_{02}$ overlaps the chip mounting region R. As a consequence, even when the RFID tag 20 is bent along any of the two reference lines $L_{01}$ and $L_{02}$ as the fold line, it is possible to reduce a risk of a crack of the semiconductor chip 23 located in the chip mounting region R.

Fifth Example

Figure 23:
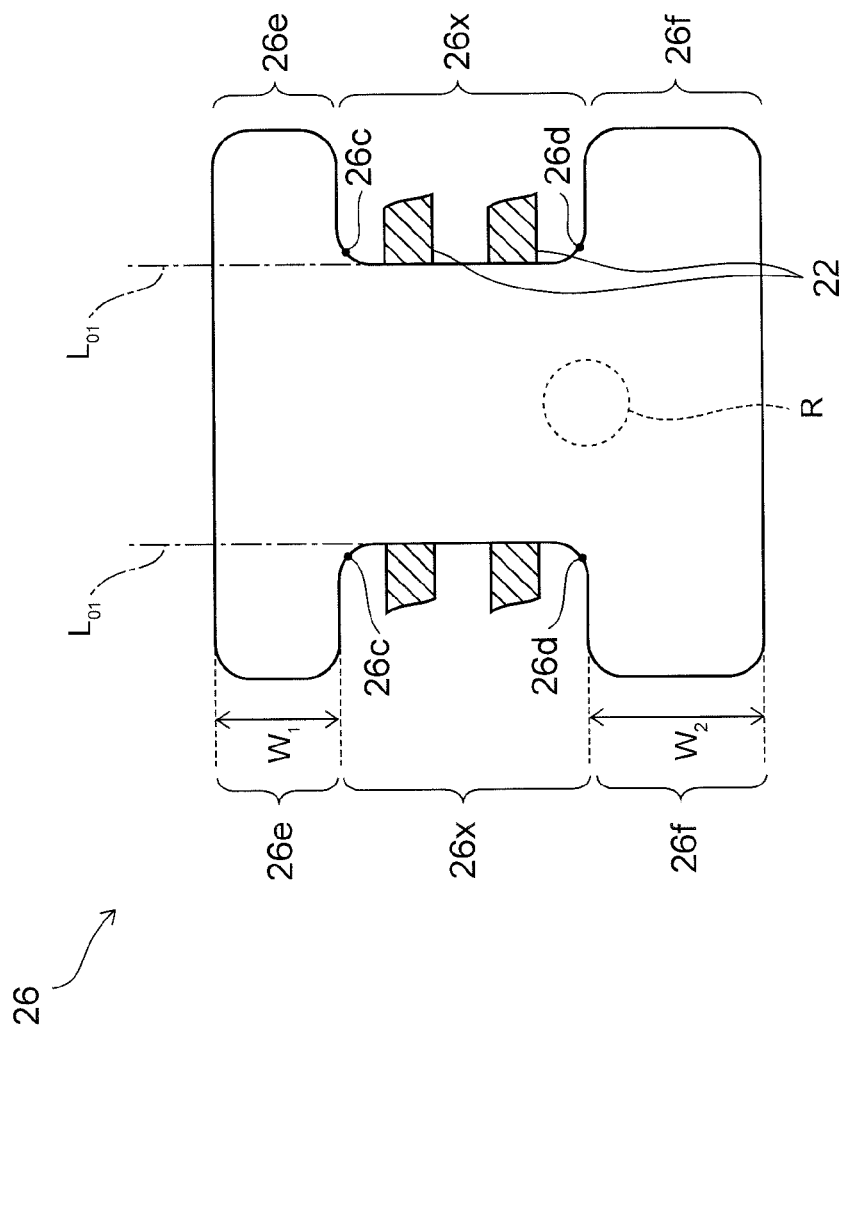
FIG. 23 is a plan view of a reinforcing member according to a fifth example of the embodiment.

FIG. 23 is a plan view of a reinforcing member 26 of a fifth example. Note that the elements in FIG. 23 which are the same as those explained in FIG. 22 of the fourth example will be denoted by the same reference numerals as those in FIG. 22, and the descriptions thereof will be omitted below.

As illustrated in FIG. 23, in this example, a width $W_2$ of the second projection 26f of the reinforcing member 26 is set greater than a width $W_1$ of the first projection 26e. Then, as in the fourth example, the chip mounting region R is provided closer to the second projection 26f than to the first projection 26e.

As described previously with reference to FIGS. 14A and 14B, the portion of the reinforcing member 26 having a smaller cross-sectional area is bent more easily.

In this example, the width $W_2$ of the second projection 26f is set greater than the width $W_1$ of the first projection 26e as described above. Accordingly, the cross-sectional area in the width direction of the first projection 26e becomes smaller than that of the second projection 26f, and hence the first projection 26e is bent more easily than the second projection 26f.

Thus, the reference line $L_0$ is formed to traverse the first projection 26e, which reduces the possibility that the reference line $L_0$ is formed in the second projections 26f. As a consequence, even when the RFID tag 20 is bent along the reference lines $L_0$, it is possible to reduce a risk of a crack of the semiconductor chip 23 located in the chip mounting region R close to the second projections 26f.

Sixth Example

Figure 24:
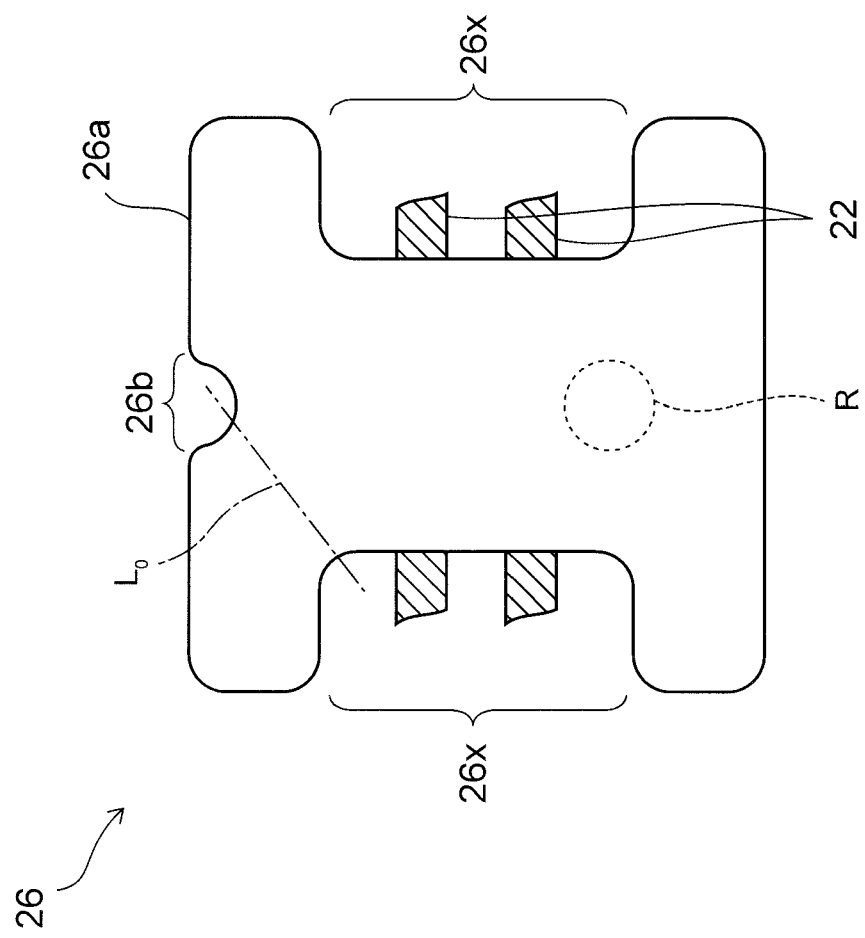
FIG. 24 is a plan view of a reinforcing member according to a sixth example of the embodiment.

FIG. 24 is a plan view of a reinforcing member 26 according to a sixth example.

In this example, a notch 26b smaller than the recesses 26x is provided at another side portion 26a, thereby locate the chip mounting region R away from the reference line $L_0$ which passes through the recesses 26x and the notch 26b.

Seventh Example

Figure 25:
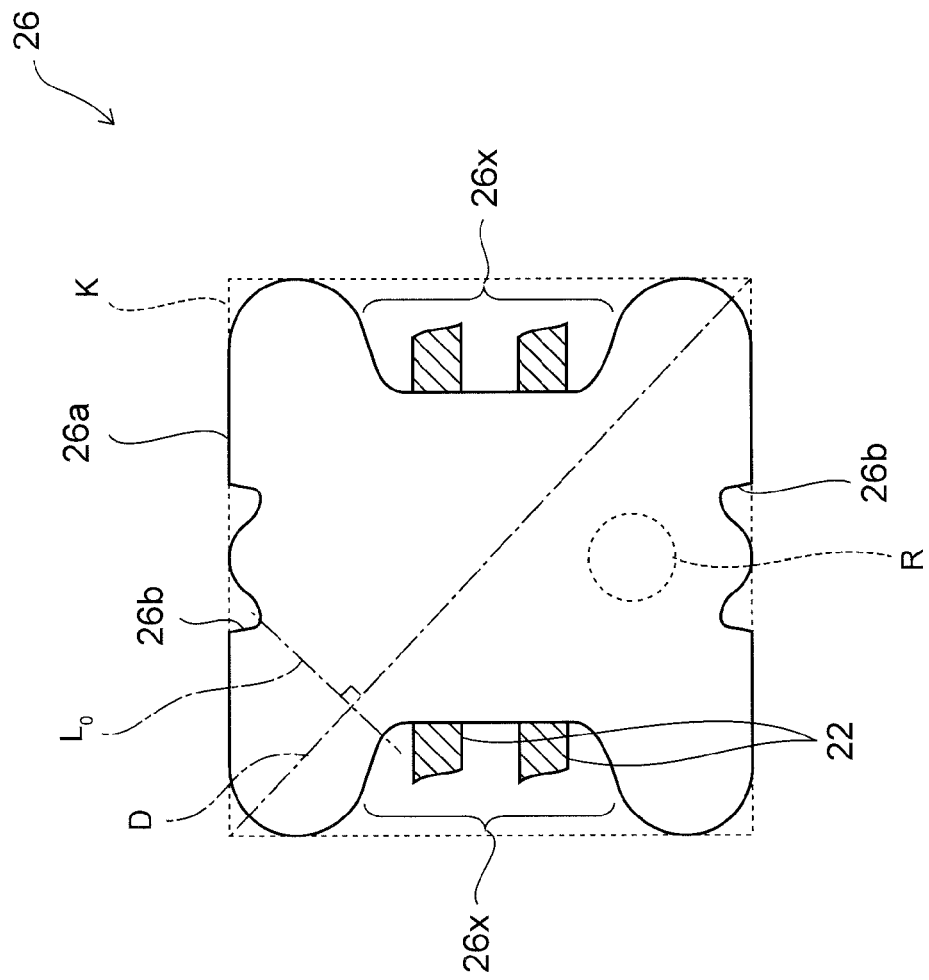
FIG. 25 is a plan view of a reinforcing member according to a seventh example of the embodiment.

FIG. 25 is a plan view of a reinforcing member 26 according to a seventh example.

In this example, the notch 26b smaller than the recesses 26x is provided at another side portion 26a as in the sixth example. Thus, the reference line $L_0$ is caused to pass through the recess 26x and the notch 26b.

Moreover, the smallest virtual rectangle K is assumed such that the reinforcing member 26 is inscribed in the rectangle K, and a diagonal line D of the rectangle K is caused to intersect with the reference line $L_0$ at right angle.

When the RFID tag 20 is twisted, the reinforcing member 26 is likely to be folded along the reference line $L_0$ serving as the fold line, which is orthogonal to the diagonal line D. Accordingly, in this example, the semiconductor chip 23 located in the chip mounting region R can be prevented from cracking even when the RFID tag 20 is twisted.

Eighth Example

Figure 26:
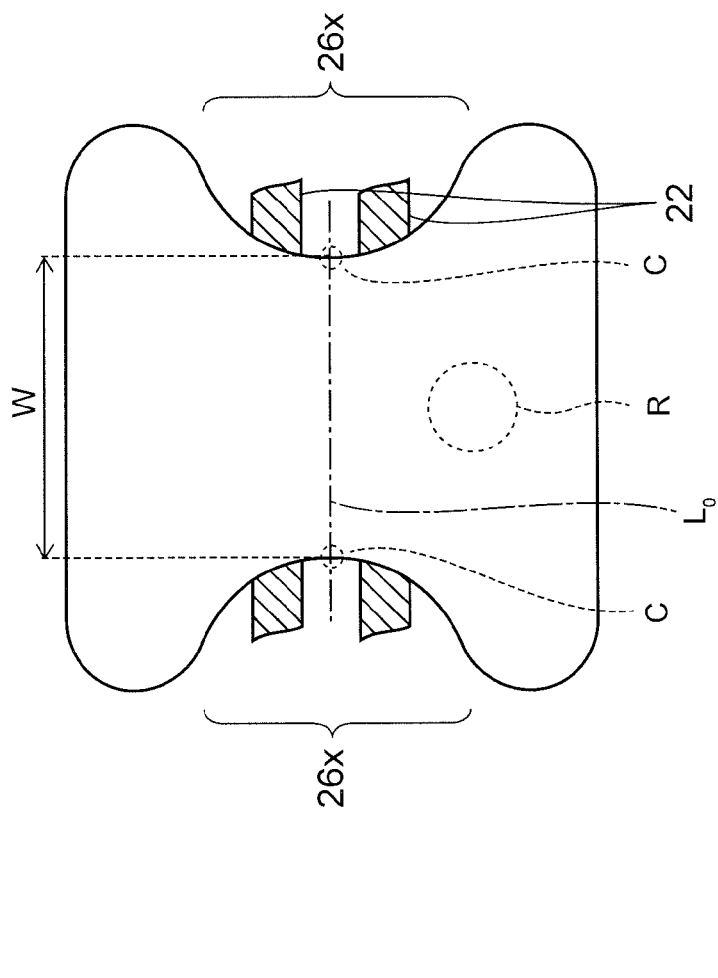
FIG. 26 is a plan view of a reinforcing member according to an eighth example of the embodiment.

FIG. 26 is a plan view of a reinforcing member 26 according to an eighth example.

In this example, the two recesses 26x are each formed into a semicircular shape, and are located opposite to each other. In this case, the reference line $L_0$ passes through central portion C of the respective recesses 26x where the width W of the reinforcing member 26 becomes the shortest. Accordingly, it is possible to locate the semiconductor chip 23 away from the reference line $L_0$ by providing the chip mounting region R at a position shifted from the central portion C.

Ninth Example

Figure 27:
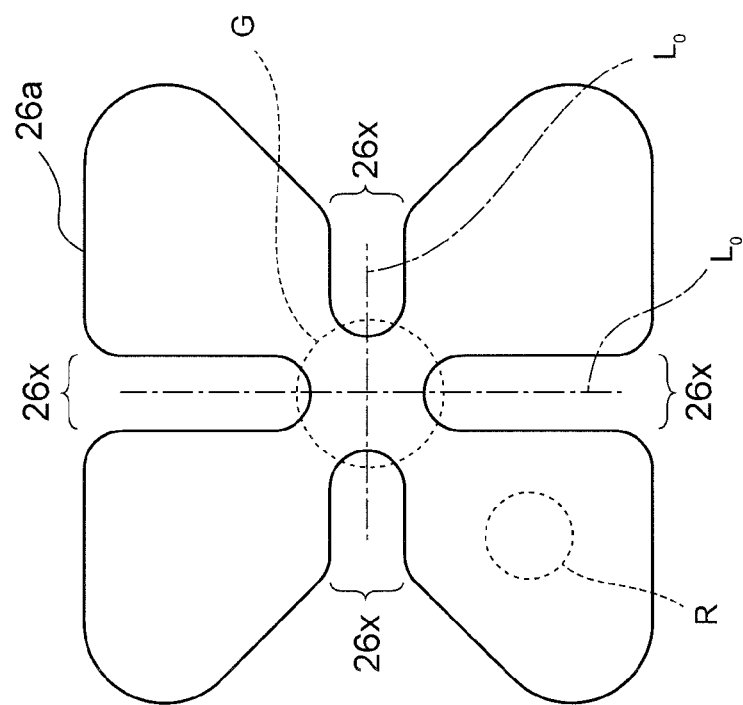
FIG. 27 is a plan view of a reinforcing member according to a ninth example of the embodiment.

FIG. 27 is a plan view of a reinforcing member 26 according to a ninth example.

In this example, a plurality of the recesses 26x is provided. In addition, the recesses 26x extend from mutually different directions toward the center G of the reinforcing member 26 in such a way as to form slits, respectively. Then, the chip mounting region R is provided beside one of the plurality of recesses 26x.

By forming the recesses 26x into the slit-like shapes in this manner, fold lines $L_0$ are formed along the recesses 26x. As a consequence, the chip mounting region R beside the recess 26x can be located away from the fold lines $L_0$.

Although the four recesses 26x are formed in this example, the number of the recesses 26x is not limited to the above. For example, two, three, five, or more recesses 26x may be formed instead.

Tenth Example

Figure 28:
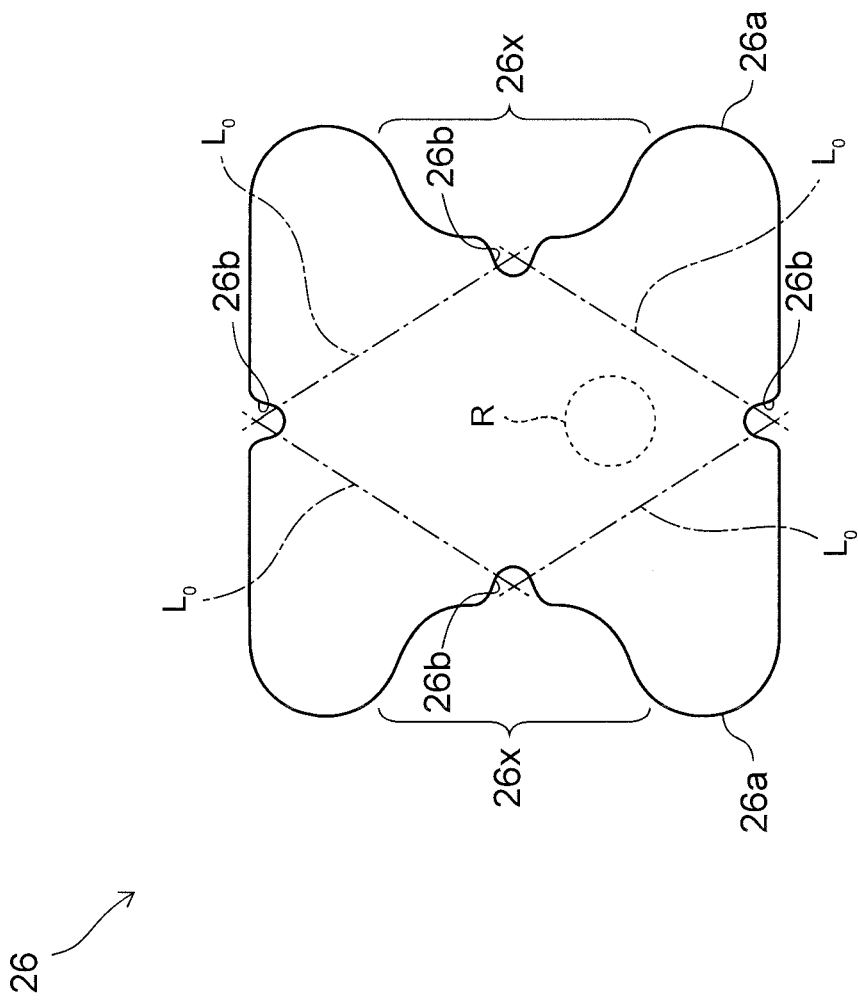
FIG. 28 is a plan view of a reinforcing member according to a tenth example of the embodiment.

FIG. 28 is a plan view of a reinforcing member 26 according to a tenth example.

In this example, the reinforcing member 26 is provided with four notches 26b. Two of the notches 26b are respectively provided at the bottoms of the two semicircular recesses 26x opposed to each other.

In this case, the reference line $L_0$ passes through two adjacent notches 26b. Hence, the semiconductor chip 23 is prevented from cracking by locating the chip mounting region R away from the reference line $L_0$.

Eleventh Example

Figure 29:
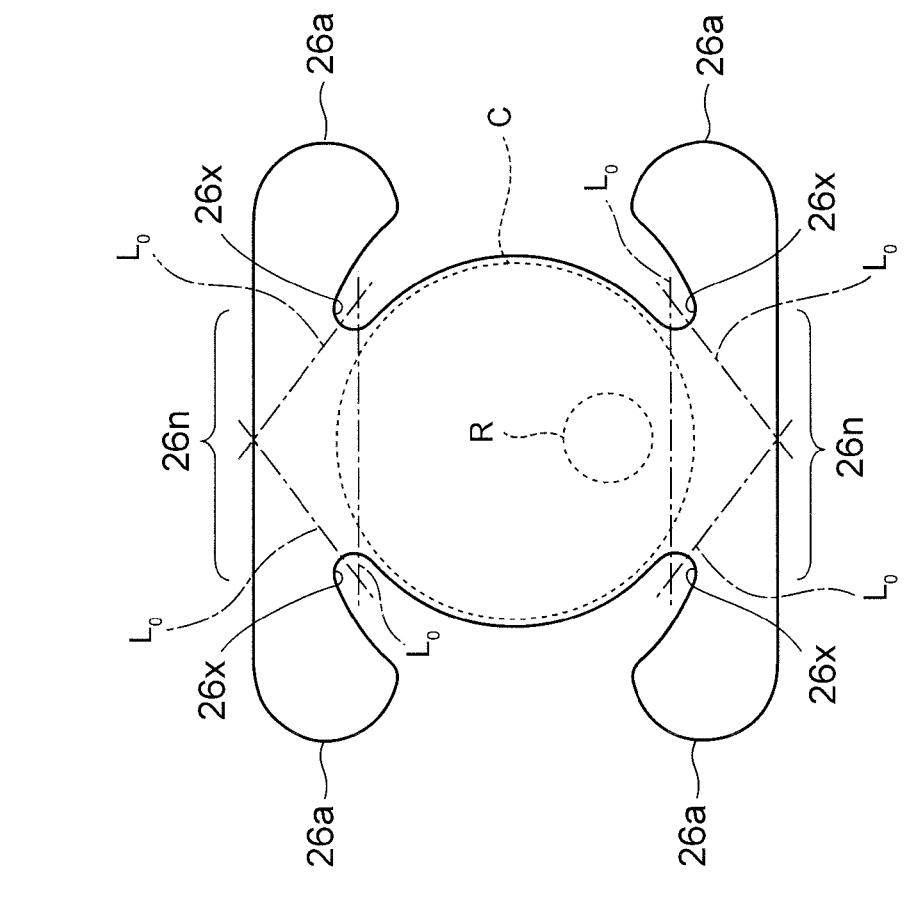
FIG. 29 is a plan view of a reinforcing member according to an eleventh example of the embodiment.

FIG. 29 is a plan view of a reinforcing member 26 according to an eleventh example.

In this example, a virtual circle C is assumed to be present in the reinforcing member 26, and arc-shaped recess 26x is provided in such a way as to extend from the side portion 26a along the virtual circle C. Four recesses 26x are provided in the reinforcing member 26. Among the recesses 26x, a pair of the adjacent recesses 26x form a constricted portion 26n.

The constricted portions 26n are formed at two positions of the reinforcing member 26, and three reference lines $L_0$ pass through each of the constricted portions 26n. One of these reference lines $L_0$ is formed to pass through both of the adjacent recesses 26x, while the rest of the two reference lines $L_0$ are each formed to pass through only one of the adjacent recesses 26x.

Then, the semiconductor chip 23 can be prevented from cracking by locating the chip mounting region R away from the reference lines $L_0$.

Twelfth Example

Figure 30:
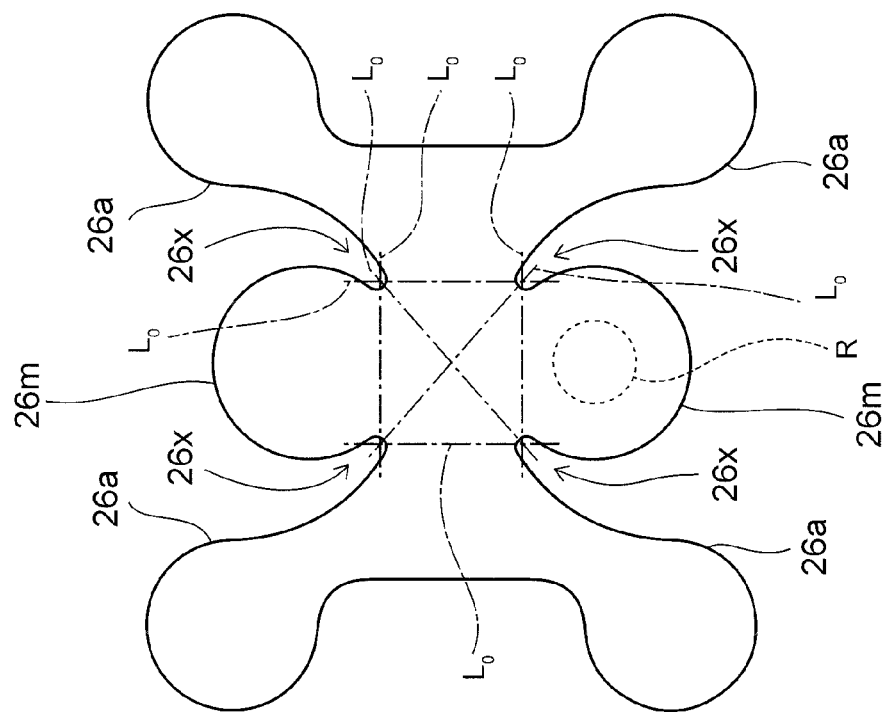
FIG. 30 is a plan view of a reinforcing member according to a twelfth example of the embodiment.

FIG. 30 is a plan view of a reinforcing member 26 according to a twelfth example.

In this example, a projection 26m having a substantially circular shape is provided to the side portions 26a of the reinforcing member 26, and the recesses 26x are respectively provided in such a way as to extend into reinforcing member 26 along edges of the projection 26m.

Here, two projections 26m are provided opposite to each other. Accordingly, there exist four recesses 26x in total.

Then, the reference lines $L_0$ are formed to pass through two of these recesses 26x, and the semiconductor chip 23 can be prevented from cracking by locating the chip mounting region R away from the reference lines $L_0$.

(Manufacturing Method)

Next, a method of manufacturing the RFID tag of the present embodiment will be described.

FIGS. 31A to 31E are cross-sectional views taken in the course of manufacturing the RFID tag of the present embodiment.

Figure 31A:
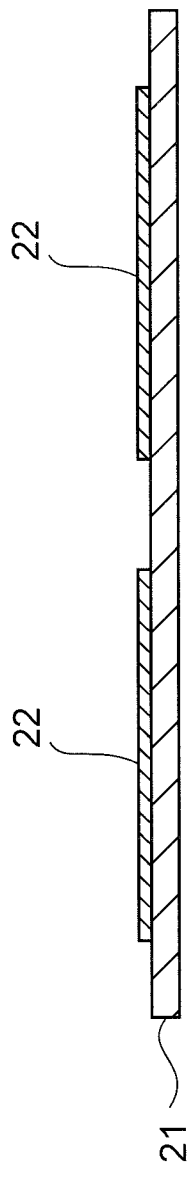

First, as illustrated in FIG. 31A, a PET sheet having a thickness of 30 μm to 100 μm is prepared as the inlet base member 21. Then, a silver layer having a thickness of from about 5 μm to 20 μm is formed by vapor deposition on the inlet base member 21. Thereafter, the silver layer is patterned into the conductive pattern 22.

Figure 31B:
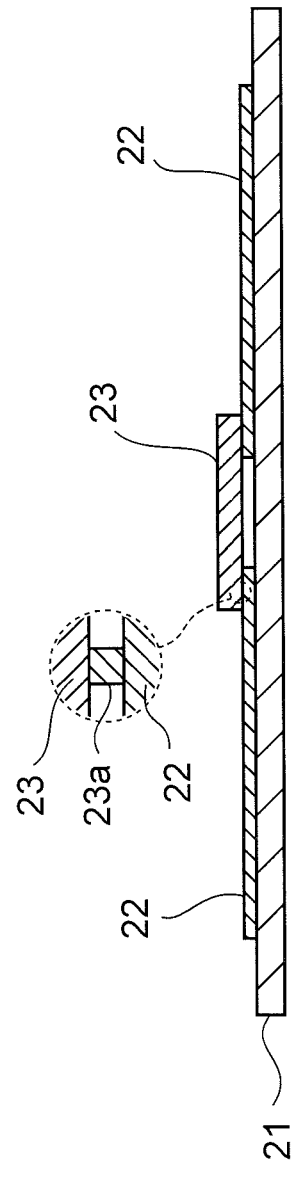

Next, as illustrated in FIG. 31B, the semiconductor chip 23 is mounted on the conductive pattern 22. In this example, the conductive pattern 22 is connected to the semiconductor chip 23 through the terminals 23a such as solder bumps and gold bumps.

Subsequently, as illustrated in FIG. 31C, a PET sheet having a thickness of 50 μm to 300 μm, which serves as the protective sheet 24, is attached from the semiconductor chip 23 side to the inlet base member 21. Likewise, the other protective sheet 24 is also attached to the back face of the inlet base member 21 where the semiconductor chip 23 is not mounted.

The method of the attachment includes, for example, a method of attaching the protective sheets 24 to the inlet base member 21 by using an unillustrated adhesive.

Next, as illustrated in FIG. 31D, the reinforcing members 26 are attached onto the protective sheets 24 on the front and back sides of the inlet base member 21 by using an unillustrated adhesive.

As described previously, the reinforcing member 26 plays the role of inhibiting the RFID tag from being bent by the external force. In the present embodiment, a PET plate having a thickness of 100 μm to 300 μm is used as the reinforcing member 26.

In addition, the reinforcing member 26 is provided with the recesses 26x as described with reference to FIG. 12 and the like. Here, the recesses 26x are formed simultaneously with the production of the reinforcing member 26 by punching the resin plate with the die. Hence, a dedicated process to form the recesses 26x is not required.

Figure 31E:
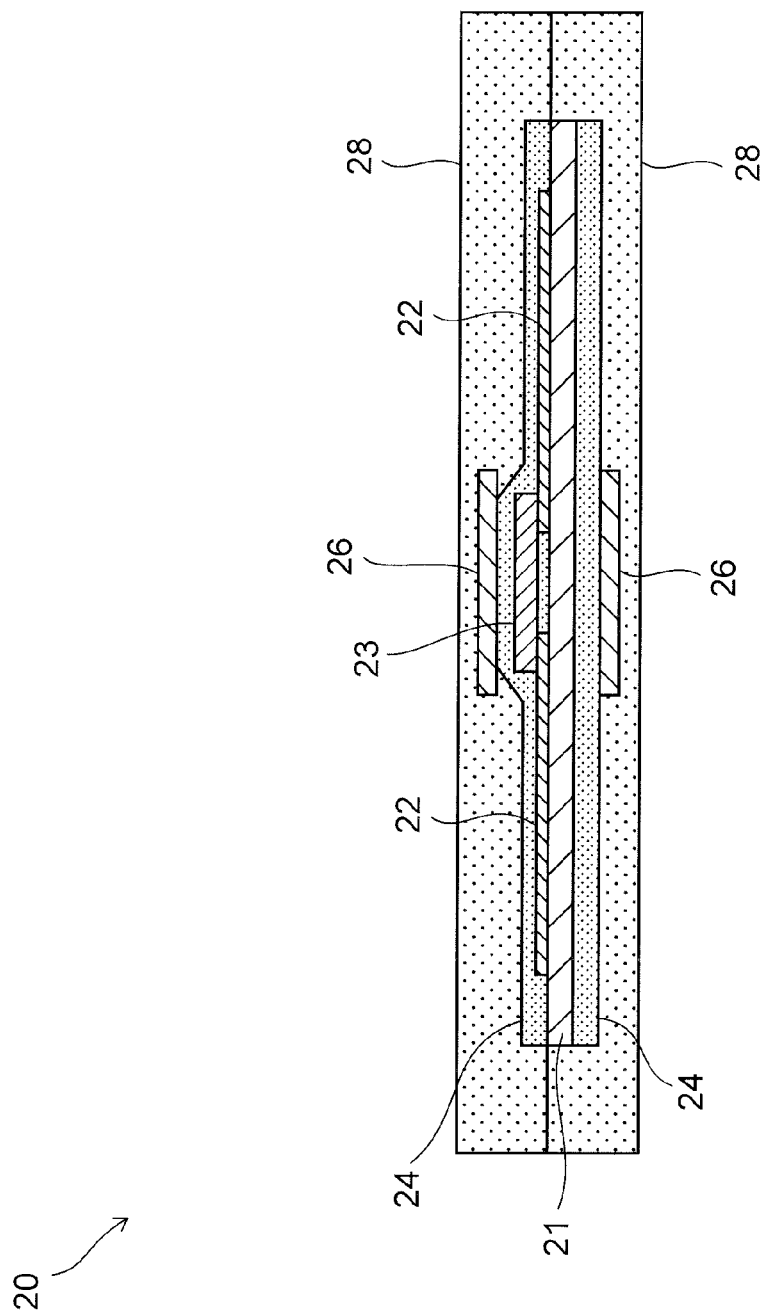

Thereafter, as illustrated in FIG. 31E, elastic sheets made of rubber or the like are attached as the external members 28 onto the reinforcing members 26 on the front and back sides. Thus, the inlet base member 21 and the semiconductor chip 23 are enclosed by the external members 28. Here, the external members 28 on the front and back sides are attached together by molecular adhesion.

Thus, the basic structure of the RFID tag 20 of the present embodiment is completed.

According to the method of manufacturing the RFID tag 20 described above, the recesses 26x are formed simultaneously with the production of the reinforcing member 26 by punching the resin plate for the reinforcing member 26 by using the die. Thus, it is possible to manufacture the RFID tag 20, which can prevent the semiconductor chip 23 from cracking, without causing an increase in the number of steps.

All examples and conditional language provided herein are intended for the pedagogical purpose of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention has been described in detail, it should be understood that the various changes, substitutions, and alterations could be made hereto without departing from the spirit and scope of the invention.

What is claimed is:

1. An RFID tag comprising:
   a base member;
   a semiconductor chip mounted on the base member; and
   an island-shaped reinforcing member covering the semiconductor chip and being configured to reinforce the base member, the reinforcing member having a side portion to which a recess is provided, where the recess serving as an originating point of a fold line such that the fold line is formed away from the semiconductor chip when the reinforcing member is folded.

2. The RFID tag according to claim 1, wherein
   a first curved portion is provided to one of two corners at a bottom of the recess,
   a second curved portion curved more gently than the first curved portion is provided to the other of the two corners, and
   the semiconductor chip is provided closer to the second curved portion than to the first curved portion.

3. The RFID tag according to claim 2, wherein
   two of the recesses are provided respectively to two side portions of the reinforcing member such that the recesses are opposed to each other,
   the first curved portions of the recesses are opposed to each other, and
   the second curved portions of the recesses are opposed to each other.

4. The RFID tag according to claim 2, wherein
   the fold line originates from the first curved portion.

5. The RFID tag according to claim 1, wherein,
   a first projection and a second projection are provided to the side portion of the reinforcing member, the first projection defining one of two sides of the recess while projecting by a first distance, the second projection defining the other of the two sides of the recess while projecting by a second distance being shorter than the first distance, and
   the semiconductor chip is provided closer to the second projection than to the first projection.

6. The RFID tag according to claim 5, wherein
   two of the recesses are provided respectively to two side portions of the reinforcing member such that the recesses are opposed to each other,
   the first projections of the recesses are opposed to each other, and
   the second projections of the recesses are opposed to each other.

7. The RFID tag according to claim 5, wherein
   the fold line passes through an originating point from which the first projection protrudes at the side portion.

8. The RFID tag according to claim 1, wherein,
   a first projection and second projection are provided to the side portion of the reinforcing member, the first projection having a first width and defining one of two sides of the recess, the second projection having a second width and defining the other of the two sides of the recess,
   the second width is larger than the first width, and
   the semiconductor chip is provided closer to the second projection than to the first projection.

9. The RFID tag according to claim 1, wherein
   a notch smaller than the recess is provided to another side portion of the reinforcing member,
   the fold line passes through the recess and the notch, and
   a diagonal line of a virtual rectangle, in which the reinforcing member is inscribed, intersects with the fold line at right angles.

10. The RFID tag according to claim 1, further comprising:
    a conductive pattern provided on the base member, wherein
    the recess and the conductive pattern overlap each other in a plan view.

11. The RFID tag according to claim 1, wherein
    a plurality of the recesses are provided,
    the plurality of the recesses extend from mutually different directions toward a center of the reinforcing member, and
    the semiconductor chip is provided beside one of the plurality of the recesses.

12. The RFID tag according to claim 1, wherein
    the base member has an elongated shape, and
    the fold line is parallel to a longitudinal direction of the base member or oblique to the longitudinal direction.

13. The RFID tag according to claim 1, wherein the fold line is the most easily foldable line among a plurality of lines formed when the reinforcing member is folded.

* * * * *